(12) United States Patent
Hassan

(10) Patent No.: US 10,892,847 B2
(45) Date of Patent: Jan. 12, 2021

(54) BLIND DETECTION MODEL OPTIMIZATION

(71) Applicant: Microsoft Technology Licensing, LLC, Redmond, WA (US)

(72) Inventor: Amer Aref Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 16/387,791

(22) Filed: Apr. 18, 2019

(65) Prior Publication Data

US 2020/0336243 A1 Oct. 22, 2020

(51) Int. Cl.
*H04B 10/60* (2013.01)
*H04L 1/00* (2006.01)
*G06N 20/00* (2019.01)
*H04B 10/25* (2013.01)
*H04J 14/02* (2006.01)

(52) U.S. Cl.
CPC ........... *H04L 1/0038* (2013.01); *G06N 20/00* (2019.01); *H04B 10/25* (2013.01); *H04B 10/60* (2013.01); *H04J 14/02* (2013.01); *H04L 1/0045* (2013.01)

(58) Field of Classification Search
CPC . H04W 72/1215; H04W 76/30; H04W 64/00; H04W 72/1268; H04W 76/10; H04W 88/06; H04W 76/12; H04W 76/19; H04W 76/32
See application file for complete search history.

(56) References Cited

U.S. PATENT DOCUMENTS

| | | |
|---|---|---|
| 3,984,190 A | 10/1976 | Barrett et al. |
| 4,150,284 A | 4/1979 | Trenkler et al. |
| 4,476,495 A | 10/1984 | Fujisawa et al. |
| 4,829,596 A | 5/1989 | Barina |
| 5,410,147 A | 4/1995 | Riza et al. |
| 5,737,366 A | 4/1998 | Gehlot |
| 5,793,880 A | 8/1998 | Constant |
| 6,148,428 A | 11/2000 | Welch et al. |

(Continued)

FOREIGN PATENT DOCUMENTS

| | | |
|---|---|---|
| EP | 0234730 B1 | 7/1992 |
| EP | 0975104 A1 | 1/2000 |

(Continued)

OTHER PUBLICATIONS

"U.S. Appl. No. 16/387,756, Non-Final Office Action dated Nov. 18, 2019", 8 pgs.

(Continued)

*Primary Examiner* — Lakeram Jangbahadur
(74) *Attorney, Agent, or Firm* — Schwegman Lundberg & Woessner, P.A.

(57) ABSTRACT

Disclosed in some examples are methods, systems, optical devices, and machine readable mediums for blind detection model optimization. The receiver may monitor one or more optimization metrics to determine whether the optimization metrics meet an optimization condition. Once the optimization condition is observed, the system may perform a blind detection model optimization without utilizing a training sequence with the transmitters. That is, the detection models are optimized using normal data sent by the transmitters.

26 Claims, 9 Drawing Sheets

(56) References Cited

U.S. PATENT DOCUMENTS

| | | |
|---|---|---|
| 6,366,381 B1 | 4/2002 | Anderson |
| 6,424,444 B1 | 7/2002 | Kahn et al. |
| 6,433,904 B1 | 8/2002 | Swanson et al. |
| 6,437,893 B1 | 8/2002 | Rivollet et al. |
| 6,490,067 B2 | 12/2002 | Bloom et al. |
| 6,580,535 B1 | 6/2003 | Schonfelder |
| 6,609,139 B1 | 8/2003 | Dultz et al. |
| 6,748,083 B2 | 6/2004 | Hughes et al. |
| 6,816,726 B2 | 11/2004 | Lysejko et al. |
| 6,851,086 B2 | 2/2005 | Szymanski |
| 6,868,236 B2 | 3/2005 | Wiltsey et al. |
| 6,915,076 B1 | 7/2005 | Mittal et al. |
| 6,963,175 B2 | 11/2005 | Archenhold et al. |
| 7,032,238 B2 | 4/2006 | Parnell et al. |
| 7,050,723 B2 | 5/2006 | Katagiri et al. |
| 7,113,708 B1 | 9/2006 | Creaney et al. |
| 7,139,491 B2 | 11/2006 | Katagiri et al. |
| 7,177,320 B2 | 2/2007 | Lysejko et al. |
| 7,212,742 B2 | 5/2007 | Peddanarappagari et al. |
| 7,286,762 B2 | 10/2007 | Elahmadi et al. |
| 7,305,091 B1 | 12/2007 | Hirano |
| 7,307,569 B2 | 12/2007 | Vrazel et al. |
| 7,477,849 B2 | 1/2009 | Ahmed et al. |
| 7,489,875 B2 | 2/2009 | Murphy |
| 7,606,272 B2 | 10/2009 | Beausoleil et al. |
| 7,689,130 B2 | 3/2010 | Ashdown |
| 7,830,575 B2 | 11/2010 | Moon et al. |
| 7,844,186 B2 | 11/2010 | Dorrer et al. |
| 7,936,829 B2 | 5/2011 | Romero et al. |
| 7,970,349 B2 | 6/2011 | Chen et al. |
| 7,983,570 B2 | 7/2011 | Han et al. |
| 7,986,783 B2 | 7/2011 | Ikushima et al. |
| 8,155,175 B2 | 4/2012 | Olgaard |
| 8,213,801 B2 | 7/2012 | Nien et al. |
| 8,295,485 B2 | 10/2012 | Yuan et al. |
| 8,552,659 B2 | 10/2013 | Ashdown et al. |
| 8,559,378 B2 | 10/2013 | Schaepperle |
| 8,873,965 B2 | 10/2014 | Giustiniano et al. |
| 8,879,925 B2 | 11/2014 | Akiyama et al. |
| 8,929,402 B1 | 1/2015 | Hughes |
| 8,948,600 B2 | 2/2015 | Kwon et al. |
| 9,014,551 B1 | 4/2015 | Stooke |
| 9,094,151 B2 | 7/2015 | Prez De et al. |
| 9,386,587 B2 | 7/2016 | Hu et al. |
| 9,401,766 B2 | 7/2016 | Yuan et al. |
| 9,608,733 B2 | 3/2017 | Pavlas et al. |
| 9,787,404 B2 | 10/2017 | Cesnik |
| 9,800,399 B2 | 10/2017 | Tanzilli et al. |
| 9,813,127 B2 | 11/2017 | George et al. |
| 9,826,540 B1 | 11/2017 | Li et al. |
| 9,859,977 B2 | 1/2018 | Zhao et al. |
| 9,946,723 B2 | 4/2018 | Lawrence |
| 10,117,120 B2 | 10/2018 | Sun et al. |
| 10,135,540 B2 | 11/2018 | Medra et al. |
| 10,182,480 B2 | 1/2019 | Scapa et al. |
| 10,187,171 B2 | 1/2019 | Doster et al. |
| 10,193,722 B2 | 1/2019 | Guha |
| 10,219,695 B2 | 3/2019 | Bhadri et al. |
| 10,230,468 B2 | 3/2019 | Mansouri Rad et al. |
| 10,231,687 B2 | 3/2019 | Kahn et al. |
| 10,333,622 B2 | 6/2019 | Bhoja et al. |
| 10,404,379 B2 | 9/2019 | Shiraishi |
| 10,476,728 B2 | 11/2019 | Zhang et al. |
| 10,686,530 B1 | 6/2020 | Hassan |
| 2001/0033406 A1 | 10/2001 | Koike et al. |
| 2002/0196510 A1 | 12/2002 | Hietala et al. |
| 2003/0030873 A1 | 2/2003 | Hietala et al. |
| 2003/0032391 A1 | 2/2003 | Schweinhart et al. |
| 2003/0072050 A1 | 4/2003 | Vrazel et al. |
| 2003/0076569 A1 | 4/2003 | Stevens |
| 2003/0223762 A1 | 12/2003 | Ho et al. |
| 2003/0231676 A1 | 12/2003 | Buckman et al. |
| 2003/0235415 A1 | 12/2003 | Peters et al. |
| 2004/0013429 A1 | 1/2004 | Duelk et al. |
| 2004/0028412 A1 | 2/2004 | Murphy |
| 2004/0057733 A1 | 3/2004 | Azadet et al. |
| 2005/0012033 A1 | 1/2005 | Stern et al. |
| 2005/0100336 A1 | 5/2005 | Mendenhall et al. |
| 2005/0213966 A1 | 9/2005 | Chown et al. |
| 2006/0088110 A1 | 4/2006 | Romero et al. |
| 2006/0115272 A1 | 6/2006 | Minato et al. |
| 2006/0127102 A1 | 6/2006 | Roberts et al. |
| 2006/0165190 A1 | 7/2006 | Tamaki et al. |
| 2006/0204247 A1 | 9/2006 | Murphy |
| 2007/0014286 A1 | 1/2007 | Lai |
| 2007/0041731 A1 | 2/2007 | Yasumoto et al. |
| 2007/0092265 A1 | 4/2007 | Vrazel et al. |
| 2007/0160212 A1 | 7/2007 | Zavriyev et al. |
| 2007/0165862 A1 | 7/2007 | Young et al. |
| 2007/0222654 A1 | 9/2007 | Vrazel et al. |
| 2007/0280684 A1 | 12/2007 | Onoda et al. |
| 2008/0019523 A1 | 1/2008 | Fuse et al. |
| 2008/0129564 A1 | 6/2008 | Kitayama et al. |
| 2008/0138087 A1 | 6/2008 | Snyder |
| 2008/0166131 A1 | 7/2008 | Hudgins et al. |
| 2008/0166135 A1 | 7/2008 | Ann |
| 2008/0224635 A1 | 9/2008 | Hayes |
| 2008/0240734 A1 | 10/2008 | Fuse |
| 2009/0148058 A1 | 6/2009 | Dane et al. |
| 2009/0245809 A1 | 10/2009 | Nakamoto |
| 2009/0269055 A1 | 10/2009 | Butler et al. |
| 2010/0054754 A1 | 3/2010 | Miller et al. |
| 2010/0142965 A1 | 6/2010 | Walewski et al. |
| 2010/0182294 A1 | 7/2010 | Roshan et al. |
| 2011/0052195 A1 | 3/2011 | Karstens |
| 2011/0234436 A1 | 9/2011 | Bogoni et al. |
| 2011/0255866 A1 | 10/2011 | Van veen et al. |
| 2011/0280576 A1 | 11/2011 | Chan et al. |
| 2012/0057506 A1 | 3/2012 | Kumar |
| 2012/0063596 A1 | 3/2012 | Brodsky et al. |
| 2012/0063774 A1 | 3/2012 | Niibe et al. |
| 2012/0128367 A1 | 5/2012 | Yamada |
| 2013/0004172 A1 | 1/2013 | Sugawa et al. |
| 2013/0188956 A1 | 7/2013 | Abe et al. |
| 2013/0216219 A1* | 8/2013 | Honda ............... H04B 10/695 398/27 |
| 2013/0236171 A1 | 9/2013 | Saunders |
| 2013/0236194 A1* | 9/2013 | Saunders ............ H04B 10/70 398/163 |
| 2013/0287403 A1 | 10/2013 | Roberts |
| 2014/0199075 A1 | 7/2014 | Huh et al. |
| 2014/0312777 A1 | 10/2014 | Shearer et al. |
| 2014/0313387 A1 | 10/2014 | Vogelsang et al. |
| 2014/0321863 A1 | 10/2014 | Diab |
| 2015/0063476 A1 | 3/2015 | Wang et al. |
| 2015/0071651 A1 | 3/2015 | Asmanis et al. |
| 2015/0071653 A1 | 3/2015 | Robinson et al. |
| 2015/0098705 A1 | 4/2015 | Motley |
| 2015/0147069 A1 | 5/2015 | Brandt-pearce et al. |
| 2015/0222359 A1 | 8/2015 | Kai et al. |
| 2015/0318928 A1 | 11/2015 | Yoo et al. |
| 2015/0365172 A1 | 12/2015 | Luo et al. |
| 2016/0036525 A1 | 2/2016 | Pirkl |
| 2016/0080087 A1 | 3/2016 | Koike-akino et al. |
| 2016/0119096 A1 | 4/2016 | Sun et al. |
| 2016/0266054 A1 | 9/2016 | Cao et al. |
| 2017/0063466 A1* | 3/2017 | Wang ............... H04B 10/07955 |
| 2017/0099139 A1 | 4/2017 | Han et al. |
| 2017/0168472 A1 | 6/2017 | Ando et al. |
| 2017/0207854 A1 | 7/2017 | Blumkin et al. |
| 2017/0250780 A1 | 8/2017 | Ge et al. |
| 2017/0302383 A1 | 10/2017 | Medra et al. |
| 2017/0325179 A1 | 11/2017 | Ameixieira |
| 2017/0366368 A1 | 12/2017 | Crayford et al. |
| 2018/0076836 A1 | 3/2018 | Zhu et al. |
| 2018/0145753 A1 | 5/2018 | Ashrafi et al. |
| 2018/0199378 A1 | 7/2018 | Son et al. |
| 2018/0205465 A1 | 7/2018 | Tanaka et al. |
| 2018/0205503 A1 | 7/2018 | Chen et al. |
| 2018/0213305 A1* | 7/2018 | Campos ............ H04J 14/0257 |
| 2018/0227651 A1 | 8/2018 | Brodsky et al. |
| 2018/0262291 A1 | 9/2018 | Doster et al. |
| 2018/0279270 A1 | 9/2018 | Sano et al. |
| 2018/0332373 A1 | 11/2018 | Wey et al. |

(56) References Cited

U.S. PATENT DOCUMENTS

| | | | |
|---|---|---|---|
| 2018/0337816 | A1 | 11/2018 | Herath et al. |
| 2019/0017824 | A1 | 1/2019 | Qiu et al. |
| 2019/0081702 | A1 | 3/2019 | Laycock et al. |
| 2019/0110084 | A1 | 4/2019 | Jia et al. |
| 2019/0140741 | A1 | 5/2019 | Cheng et al. |
| 2019/0149236 | A1 | 5/2019 | Wang et al. |
| 2019/0191383 | A1 | 6/2019 | Dang et al. |
| 2019/0214852 | A1 | 7/2019 | Park |
| 2019/0239753 | A1 | 8/2019 | Wentz |
| 2019/0245646 | A1 | 8/2019 | Robert Safavi et al. |
| 2019/0280809 | A1 | 9/2019 | Cho et al. |
| 2019/0312694 | A1 | 10/2019 | Jia et al. |
| 2019/0317286 | A1 | 10/2019 | Seyedi et al. |
| 2019/0317315 | A1 | 10/2019 | Wang et al. |
| 2019/0376820 | A1 | 12/2019 | Jones et al. |

FOREIGN PATENT DOCUMENTS

| | | |
|---|---|---|
| EP | 1508989 A2 | 2/2005 |
| EP | 2903187 A1 | 8/2015 |
| EP | 3244554 A1 | 11/2017 |
| RU | 2009104211 A | 8/2010 |
| WO | 0077962 A1 | 12/2000 |
| WO | 02082694 A1 | 10/2002 |
| WO | 2007083157 A1 | 7/2007 |
| WO | 2013097088 A1 | 7/2013 |

OTHER PUBLICATIONS

"U.S. Appl. No. 16/387,774, Notice of Allowance dated Sep. 30, 2019", 8 pgs.

"U.S. Appl. No. 16/388,178, Notice of Allowance dated Oct. 1, 2019", 12 pgs.

"U.S. Appl. No. 16/388,211, Non-Final Office Action dated Oct. 3, 2019", 18 pgs.

"U.S. Appl. No. 16/388,258, Notice of Allowance dated Nov. 19, 2019", 10 pgs.

"U.S. Appl. No. 16/388,373, No- Final Office Action dated Nov. 15, 2019", 9 pgs.

"Poisson Regression", [online]. Retrieved from the Internet: <URL: https://docs.microsoft.com/en-us/azure/machine-learning/studio-module-reference/poisson-regression>, (Jan. 27, 2018), 7 pgs.

"T1.2 / Project xxxx/ Rev 0.5", Information Technology: Fibre Channel—Methodologies for Signal Quality Specification—3 FC-MSQS-3, (Jan. 26, 2017), 22 pgs.

Donovan, James, "How Multiplexing Techniques Enable Higher Speeds on Fiber Optics Cabling", [online]. Retrieved from the Internet: URL: https://www.commscope.com/Blog/How-Multiplexing-Techniques-Enable-Higher-Speeds-on-Fiber-Optic-Cabling/>, (Jul. 25, 2016), 7 pgs.

Quimby, Richard S., Section 24-3. Power Budget in Fiber Optic Link—Receiver Sensitivity, *Photonics and Lasers—An Introduction*, John Wiley & Sons, Inc., Hoboken, New Jersey, (2006), 464-469.

Van Der Bij, Erik, "Fibre Channel Overview", [online]. Retrieved from the Internet: <URL: http://hsi.web.cern.ch/HSI/fcs/spec/overview.htm>, (Aug. 15, 1994), 10 pgs.

"Notice of Allowance Issued in U.S. Appl. No. 16/387,784", dated Mar. 11, 2020, 11 Pages.

"Non Final Office Action Issued in U.S. Appl. No. 16/387,835", dated Feb. 5, 2020, 7 Pages.

"Notice of Allowance Issued in U.S. Appl. No. 16/388,373", dated Feb. 27, 2020, 11 Pages.

"Non Final Office Action Issued in U.S. Appl. No. 16/387,813", dated Apr. 3, 2020, 10 Pages.

"Non Final Office Action Issued in U.S. Appl. No. 16/387,819", dated Apr. 6, 2020, 11 Pages.

"Final Office Action Issued in U.S. Appl. No. 16/388,211", dated Mar. 31, 2020, 16 Pages.

U.S. Appl. No. 16/387,756, filed Apr. 18, 2019, Throughput Increases for Optical Communications.

U.S. Appl. No. 16/387,774, filed Apr. 18, 2019, Power Switching for Systems Implementing Throughput Improvements for Optical Communications.

U.S. Appl. No. 16/387,784, filed Apr. 18, 2019, Receiver Training for Throughput Increases in Optical Communications.

U.S. Appl. No. 16/388,178, filed Apr. 18, 2019, Power-Based Encoding of Data to Be Transmitted Over an Optical Communication Path.

U.S. Appl. No. 16/388,211, filed Apr. 18, 2019, Power-Based Decoding of Data Received Over an Optical Communication Path.

U.S. Appl. No. 16/388,340, filed Apr. 18, 2019, Power-Based Decoding of Data Received Over an Optical Communication Path.

U.S. Appl. No. 16/388,258, filed Apr. 18, 2019, Power-Based Encoding of Data to Be Transmitted Over an Optical Communication Path.

U.S. Appl. No. 16/387,802, filed Apr. 18, 2019, Error Control Coding With Dynamic Ranges.

U.S. Appl. No. 16/388,373, filed Apr. 18, 2019, Power-Based Encoding of Data to Be Transmitted Over an Optical Communication Path.

U.S. Appl. No. 16/388,393, filed Apr. 18, 2019, Power-Based Decoding of Data Received Over an Optical Communication Path.

U.S. Appl. No. 16/387,813, filed Apr. 18, 2019, Throughput Increases for Optical Communications.

U.S. Appl. No. 16/387,819, filed Apr. 18, 2019, System for Throughput Increases for Optical Communications.

U.S. Appl. No. 16/387,827, filed Apr. 18, 2019, Transmitter for Throughput Increases for Optical Communications.

U.S. Appl. No. 16/387,835, filed Apr. 18, 2019, Unequal Decision Regions for Throughput Increases for Optical Communications.

"LDM | Layered Division Multiplexing | Power Division Multiplexing", Retrieved from https://web.archive.org/web/20170220135434/http:/www.rfwireless-world.com/Terminology/LDM-vs-TDM-vs-FDM.html, Feb. 20, 2017, 5 Pages.

"Notice of Allowance Issued in U.S. Appl. No. 16/387,774", dated Sep. 30, 2019, 8 Pages.

Feng, et al., "Digital Domain Power Division Multiplexing DDO-OFDM Transmission with Successive Interference Cancellation", In Conference on Lasers and Electro-Optics, Jun. 5, 2016, 2 Pages.

Quimby, Richard S., "Photonics and Lasers: An Introduction", In Publications of John Wiley & Sons, Apr. 14, 2006, 533 Pages.

Wu, et al., "Digital Domain Power Division Multiplexed Dual Polarization Coherent Optical OFDM Transmission", In Journal of Computing Research Repository, Jul. 2017, 9 Pages.

"Non Final Office Action Issued in U.S. Appl. No. 16/388,340", dated May 8, 2020, 20 Pages.

"Non Final Office Action Issued in U.S. Appl. No. 16/388,393", dated May 7, 2020, 20 Pages.

"International Search Report and Written Opinion Issued in PCT Application No. PCT/US2019/063124", dated Mar. 27, 2020, 11 Pages.

"Non Final Office Action Issued in U.S. Appl. No. 16/387,802", dated Jun. 22, 2020, 9 Pages.

Cuccato, et al., "Complete and Compact 32-Channel System for Time-Correlated Single-Photon Counting Measurements", In Journal of IEEE Photonics Journal, vol. 5, Issue 5, Oct. 2, 2013, 14 Pages.

"Notice of Allowance Issued in U.S. Appl. No. 16/387,813", dated Jul. 23, 2020, 7 Pages.

Hsu, et al., "Multilevel Priority Scheme for Fiber-Optic-Code Division Multiple Access (CDMA) Packet Networks", In Proceedings of IEEE INFOCOM '93 The Conference on Computer Communications, Mar. 28, 1993, pp. 1359-1366.

"International Search Report and Written Opinion Issued in PCT Application No. PCT/US2020/024325", dated Jun. 18, 2020, 16 Pages.

"International Search Report and Written Opinion Issued in PCT Application No. PCT/US2020/024368", dated Jun. 22, 2020, 10 Pages.

"Non Final Office Action Issued in U.S. Appl. No. 16/387,827", dated May 27, 2020, 9 Pages.

(56) References Cited

OTHER PUBLICATIONS

Khan, et al., "Visible Light Communication using Wavelength Division Multiplexing for Smart Spaces", In Proceedings of the IEEE Consumer Communications and Networking Conference (CCNC), Jan. 14, 2012, pp. 230-234.
"International Search Report and Written Opinion Issued in PCT Application No. PCT/US2019/063121", dated Apr. 1, 2020, 13 Pages.
Elsherif, et al., "Performance Enhancement of Mapping Multiplexing Technique Utilising Dual-Drive Mach—Zehnder Modulator for Metropolitan Area Networks", In Journal of IET Optoelectronics, vol. 9, Issue 2, Apr. 2015, pp. 108-115.
Linden, et al., "Improvement on Received Optical Power Based Flexible Modulation in a PON by the Use of Non-Uniform PAM", In Proceedings of European Conference on Optical Communication, Sep. 17, 2017, 3 pages.
"International Search Report & Written Opinion Issued in PCT Application No. PCT/US20/014304", dated Jul. 21, 2020, 11 Pages.
"International Search Report & Written Opinion Issued in PCT Application No. PCT/US20/024323", dated Aug. 3, 2020, 11 Pages.
"International Search Report & Written Opinion Issued in PCT Application No. PCT/US20/024328", dated Aug. 3, 2020, 13 Pages.
"International Search Report & Written Opinion Issued in PCT Application No. PCT/US20/024366", dated Jul. 17, 2020, 12 Pages.
"International Search Report & Written Opinion Issued in PCT Application No. PCT/US20/024370", dated Aug. 3, 2020, 12 Pages.
"International Search Report & Written Opinion Issued in PCT Application No. PCT/US20/024535", dated Jul. 6, 2020, 13 Pages.
"International Search Report & Written Opinion issued in PCT Application No. PCT/US20/024529", dated Aug. 7, 2020, 11 Pages.
Simon, et al., "Performance Analysis and Tradeoffs for Dual-Pulse PPM on Optical Communication Channels With Direct Detection", In Proceedings of IEEE Transactions on Communications, vol. 52, Issue 11, Nov. 1, 2004, pp. 1969-1979.
Feng, et al., "Spectrally overlaid DDO-OFDM transmission enabled by optical power division multiplexing", In Proceedings of 15th International Conference on Optical Communications and Networks (ICOCN), Sep. 24, 2016, 3 Pages.
Han, et al., "Power division multiplexing", In Proceedings of IEEE/CIC International Conference on Communications in China (ICCC), Jul. 27, 2016, 6 Pages.
"International Search Report and Written Opinion Issued in PCT Application No. PCT/US20/024522", dated Jul. 16, 2020, 14 Pages.
"International Search Report and Written Opinion Issued in PCT Application No. PCT/US20/024533", dated Jul. 16, 2020, 12 Pages.
"International Search Report and Written Opinion Issued in PCT Application No. PCT/US20/024534", dated Jul. 16, 2020, 11 Pages.
"International Search Report and Written Opinion Issued in PCT Application No. PCT/US20/024536", dated Jul. 6, 2020, 12 Pages.
Salehi, et al., "Code division multiple-access techniques in optical fiber networks—Part I: Fundamental principles", In Proceedings of IEEE Transactions on Communications, vol. 37, Issue 8, Aug. 1, 1989, pp. 824-833.
Non Final Office Action Issued in U.S. Appl. No. 16/388,211, dated Aug. 7, 2020, 18 Pages.

\* cited by examiner

US 10,892,847 B2

BLIND DETECTION MODEL OPTIMIZATION

BACKGROUND

Optical communications; such as fiber optic communications utilize a light source at one end that transmits one or more data streams by modulating the data stream into light signals. These light signals pass through a medium such as air or a glass fiber with internally reflective surfaces (a fiber optic fiber) to a receiver which employs a photon detection module to detect the light signals. The detected light is then demodulated back into one or more data streams.

In order to effectively utilize the available light bandwidth; a number of distinct channels may be created by assigning a different light wavelength to each channel. Different data streams may be placed on each channel and transmitted simultaneously over a same medium to a same receiver. This practice is commonly referred to as Wavelength Division Multiplexing (WDM). Some WDM systems allow up to 80 such channels per fiber and per channel bandwidth may be 40 Gbit/second to produce almost 3.1 terabits/second of transmission on a single fiber (not including losses due to overhead).

As a result of this large bandwidth, fiber optic systems are becoming increasingly popular with communication network providers; cloud service providers, and other entities that need to transfer large amounts of data very quickly. In addition to carrying a large amount of data, fiber optics offer other advantages such as: less attenuation than electrical cables—which provides the benefit of utilizing less network infrastructure for longer runs of communication cables; lack of electromagnetic interference; and various other benefits.

BRIEF DESCRIPTION OF PIE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
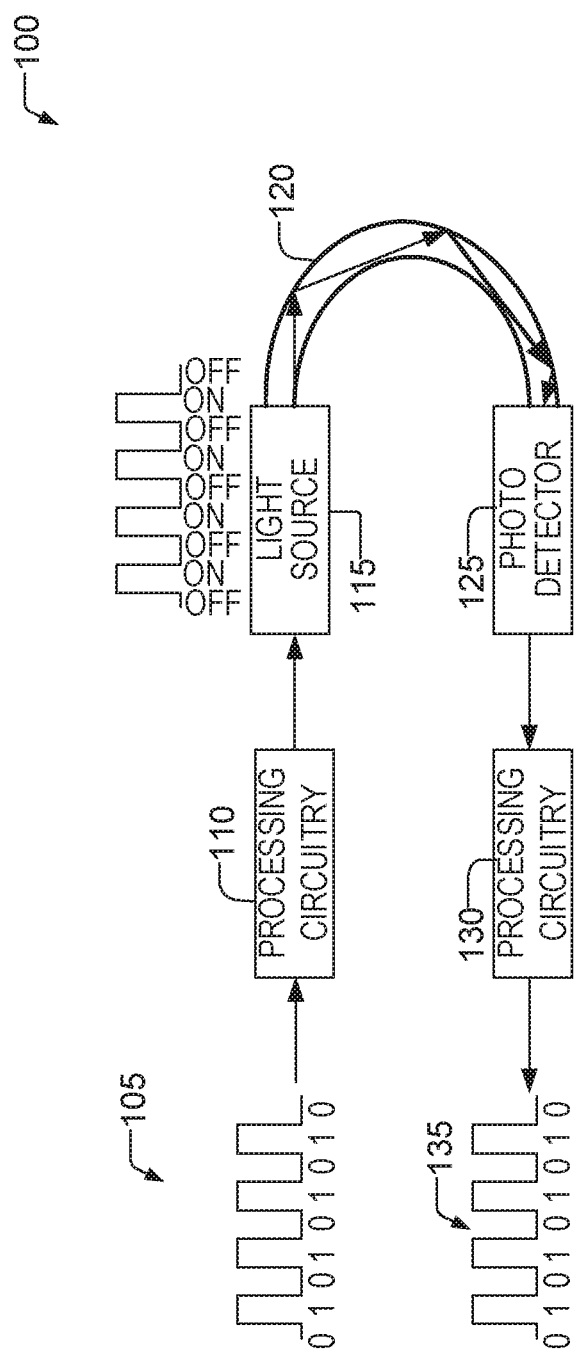
FIG. 1 illustrates components of a simplified optical communication system according to some examples of the present disclosure.

FIG. 1 illustrates components of a simplified optical communication system in the form of a fiber optic system 100 according to some examples of the present disclosure. A data stream 105 may comprise binary data produced by higher network layers that is processed by processing circuitry 110, Processing circuitry 110 may process the data of data stream 105 in one or more ways to prepare it for transmission. Example processing operations performed by the processing circuitry 110 includes applying one or more error correction codes (ECCs), compression algorithms, encryption algorithms, and/or the like. The data, as transformed by the processing circuitry 110, is then passed as a control signal to a light source 115. The light source 115 modulates the data by selectively turning the light source on an off in accordance with the input data according to a modulation scheme. For example, in a simple modulation scheme, each bit may be transmitted during a predetermined period of time (e.g., a timeslot). During a particular timeslot, if the current bit from the input data is a '1', the light source may be turned on during the timeslot and if the current bit from the input data is a '0', the light source may be turned off during the timeslot. Other, more complex modulation schemes may be utilized such as amplitude, phase, or polarization modulation. In some examples, the light may be modulated on a sine wave.

The light produced by the light source then travels over an optical communication path to the receiver. An optical communication path is the path taken by the light source from the transmitting light source to the receiving sensor. This path may be through one or more mediums, such as a single fiber optic fiber, air, or the like. In the example of FIG. 1 the optical communication path travels across a single fiber optic fiber 120. In examples in which the medium is air, the optical communication path may be the alignment of the transmitting light source and the sensor at the receiver.

The receiver includes a photo detector 125 and processing circuitry 130. The photo detector 125 collects a count of a number of photons detected over a detection time period which corresponds to an amount of time that a single bit of the data stream 105 is transmitted. Based upon the photon counts, the photo detector produces a data stream that is then input to the processing circuitry 130 which applies an inverse operation than that was applied by the processing circuitry 110 to produce data stream 135. The goal is to transmit data stream 105 to the receiver as fast as possible while having data stream 135 match data stream 105.

As already noted, WDM may be used to optimize usage of the optical communication path. Other techniques such as Amplitude Modulation (AM), and Digital Domain Power Division Multiplexing (DDPDM) also increase the bandwidth of the medium. As will be made clear, none of these techniques make full use of the entire bandwidth available in the medium and in some cases, these techniques present undesirable drawbacks. For example, none of these techniques allow for two different transmitters with two different light sources to transmit simultaneously at a same wavelength and through the same communication path fiber) as the receiver. Further, the decision regions used to make bit assignments to each stream are equal for each bit combination in these techniques (the photon count region corresponding to a detected bit combination). These symmetric decision regions present difficulty in situations where different transmitters have slightly different power levels. Finally, for DDPDM, the decoding, demodulation, and interference cancellation used are very complicated and require significant processing resources. For example, DDPDM demodulates and remodulates a same signal several times at the receiver. This increases device cost and/or decoding time.

Another technique, Optical Power Level Modulation (OPLM) described by co-pending application "Power Switching for Systems Implementing Throughput Improvements for Optical Communications" by Amer Hassan and Edward Giaimo, received application Ser. No. 16/387,774, filed Apr. 18, 2019, now issued as U.S. Pat. No. 10,756,817, which is hereby incorporated by reference in their entirety, allows for the transmission of multiple streams of data across a same optical communication path (e.g., a same fiber optic fiber) using different light sources transmitting at different power levels with a same wavelength. OPLM techniques may be combined with a variety of modulation schemes, such as simple modulation schemes in which a light source is turned on for transmitting a '1' and turned off to transmit a '0' and more complicated schemes such as AM, DDPDM, WDM, and the like. In OPLM systems each light source corresponding to each stream transmits at a same frequency and on the same optical communication path using a different power level. The receiver demultiplexes the data for each stream by applying one or more detection models to the photon counts observed at the receiver to determine likely bit assignments for each stream.

Since each light source is transmitting at different power levels, a first light source activated alone, a second light source activated alone, or both activated together produces different photon counts detected at the receiver. A detection model in the form of a Poisson distribution (or other detection model) may calculate probabilities that each light source is activated based upon these photon counts. This may be used to assign bit values to each stream. Thus detection models such as Poisson distributions may be utilized to demultiplex the streams. For example, consider a system with two data streams and two light sources using a modulation scheme where the light source activating signals a '1' in the bitstream and the light source being off signals a '0' in the bitstream. In this system, the first model may indicate a probability that the first light source is on and the second light source is off—this corresponds to a bit combination of '1' and '0.' The second model may indicate a probability that the second light source is on and the first light source is off—this corresponds to a bit combination of '0' and '1.' The third model may indicate a probability that both light sources are activated and thus corresponds to a bit combination of '1' and '1'.

As a result, multiple streams of data from multiple light sources may be sent on a single optical link which may double, triple, quadruple, or more the bandwidth of a single channel on a single link. In addition, the problems of other techniques may be avoided. For example, the decision regions (e.g., the Poisson distributions) for each bit combination may not be the same as the decision regions for other bit combinations (e.g., the area under the curves in FIG. 3). This allows for light sources of differing power levels. Furthermore, detection is very simple, unlike DDPDM. Additionally, since multiple light sources can be used, the system may support multiple users on a same communication path (e.g., a same fiber optic fiber).

Figure 2:
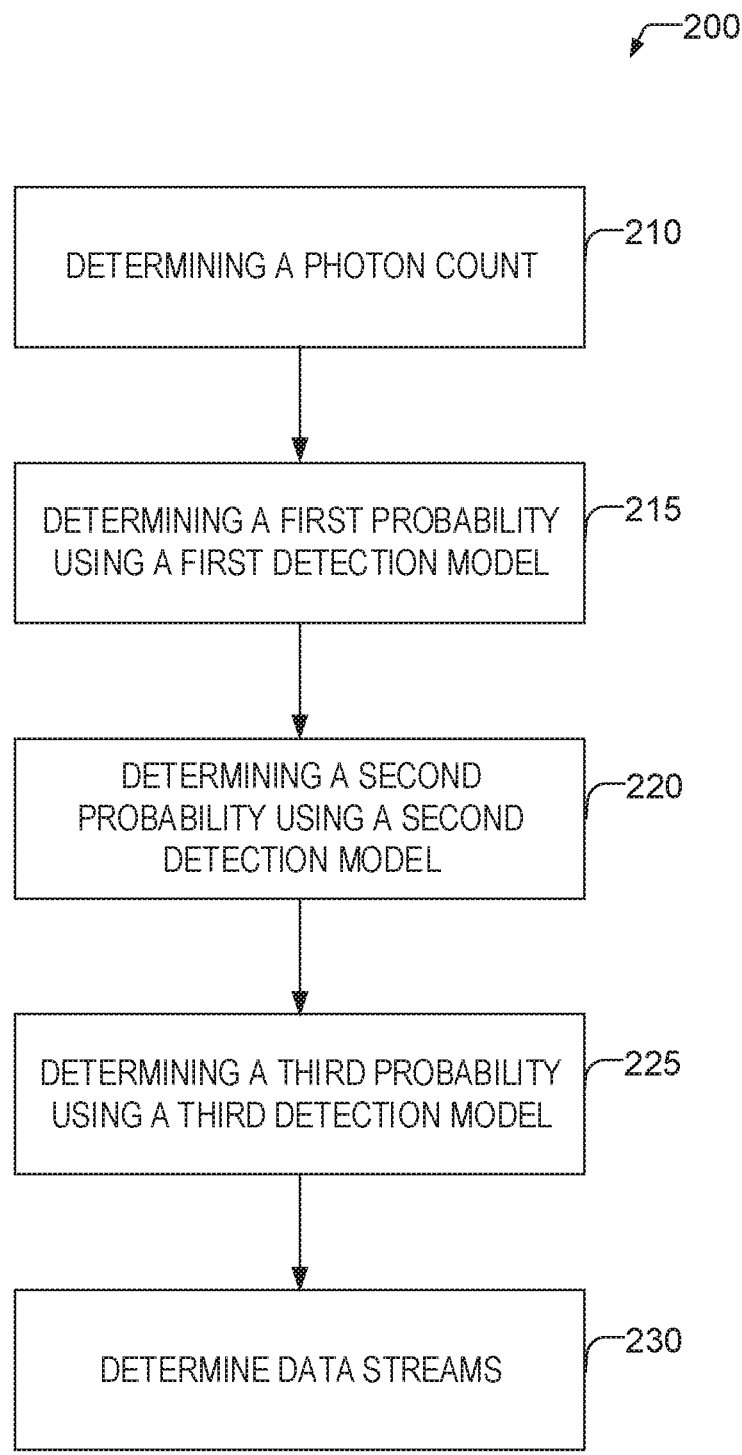
FIG. 2 illustrates a Optical Power Level Modulation (OPLM) method performed by a receiver in decoding data according to some examples of the present disclosure.

FIG. 2 illustrates an OPLM method 200 performed by a receiver in demultiplexing data according to some examples of the present disclosure. At operation 210 the receiver may determine a photon count of photons observed during a predetermined period of time. The predetermined period of time may be a period of time (e.g., a timeslot) during which the transmitters and receivers are synchronized to transmit one or more bits of a bit stream (e.g., bits of a packet). At operation 215, the receiver determines a first probability using the photon count and a first detection model that a first light source corresponding to a first data stream is on at a first power level and a second light source corresponding to a second data stream is off. At operation 220, the receiver determines a second probability using the photon count and a second detection model that a first light source corresponding to a first data stream is off and a second light source corresponding to a second data stream is on at a second power level. At operation 225, the receiver determines a third probability using the photon count and a third detection model that the first light source is on at the first power level and the second light source is on at the second power level.

The detection models may be Poisson probability distributions, machine learned models (e.g., neural networks, regression models, clustering models, decision trees,) and the like. For example, as noted, a first light source transmitting at a first power level alone, a second light source transmitting at a second power level alone, and both the first and second light sources transmitting together may produce different average number of photons that strike a receiver. Thus, the probability of a particular combination of light sources causing those photons to strike the receiver may be modeled using Poisson distributions. These Poisson distributions may be utilized as detection models.

At operation 230, the system may determine bit values for the first and second data streams based upon the first, second, and third probabilities. For example, a model producing a highest probability value may be selected and bit values corresponding to that model may be assigned to the bit stream. As noted, the detection models may correspond to bit-values of the various data streams. In some examples, a value of '0' for both bit streams may be determined (e.g., before operations 215, 220, and 225 or during operation 230) by comparing the photon count to a predetermined minimum threshold. In other examples, a separate model may be used for a value of '0' for both bit streams. The method 200 is utilized for two light sources and two bit streams, but may be applied for additional light sources with additional bitstreams. In yet other examples, a single model may output bit assignments.

The OPLM system solves the technical problem of efficient bandwidth utilization in optical communications without the drawbacks of previous approaches discussed above. For example, this method allows for multiple data streams transmitted using a single light source or multiple data streams transmitted using multiple light sources. In the present disclosure, any interference from multiple light sources are accounted for by the detection models which are trained using any such interference. Also, due to the possibility that the models may have unequal decision regions, the use of different light sources with different power levels does not pose a problem like it does with AM and DDPDM. Furthermore, the models may adapt over time to factor in aging transmitter circuitry. In contrast to DDPDM, the present disclosure does not require remodulation of a received signal by doing a successive interference cancellation. Instead, the present disclosure utilizes average photon counts for a particular bit combination. Because the disclosed detection models are relatively simple probability distributions, the process of decoding and demultiplexing the data streams may use comparatively simple, cheap, and fast hardware and/or software to demultiplex the input rather than needing more complex hardware such as necessary in approaches using successive interference cancellation.

OPLM uses a training sequence to determine the detection models. For example, by instructing each light source to activate alone, and in combination with each other light source to determine average photon counts for each combination. The average photon counts may be used to build the detection models, such as Poisson probability models, or to train a supervised or unsupervised machine-learning model. During operation, the photon counts observed during a transmission time slot are submitted to each detection model and the detection model with the highest probability may be chosen. The bit assignment corresponding to that detection model may be assigned as the bits for each particular stream.

While this works for initially setting up the models, changes to the medium such as changes to the fiber optic, changes to the power output of the light sources over time, or other factors may cause errors in demultiplexing bits. Rerunning the training sequence periodically may correct these errors but may cause data transmission delays while the training sequence is rerun.

Disclosed in some examples are methods, systems, optical devices, and machine readable mediums for blind detection model optimization. The receiver may monitor one or more optimization metrics to determine whether the optimization metrics meet an optimization condition. Once the optimization condition is observed, the system may perform a blind detection model optimization without utilizing a training sequence with the transmitters. That is, the detection models are optimized using normal data sent by the transmitters. For example, if the optimization condition is an error threshold and if an error rate, as determined by an ECC, is over the error threshold, the system may begin a detection model optimization. The system may save a set of observed data that comprises sets of photon counts and demultiplexed bit combinations and/or correct bit combinations as determined by the ECC. The set of observed data may include both correctly demultiplexed and incorrectly demultiplexed data. This observed set may be utilized to adjust the detection models to reduce the error rate. For example, a median and/or range of the detection models may be adjusted to produce the lowest error rate in the observed set.

Figure 3:
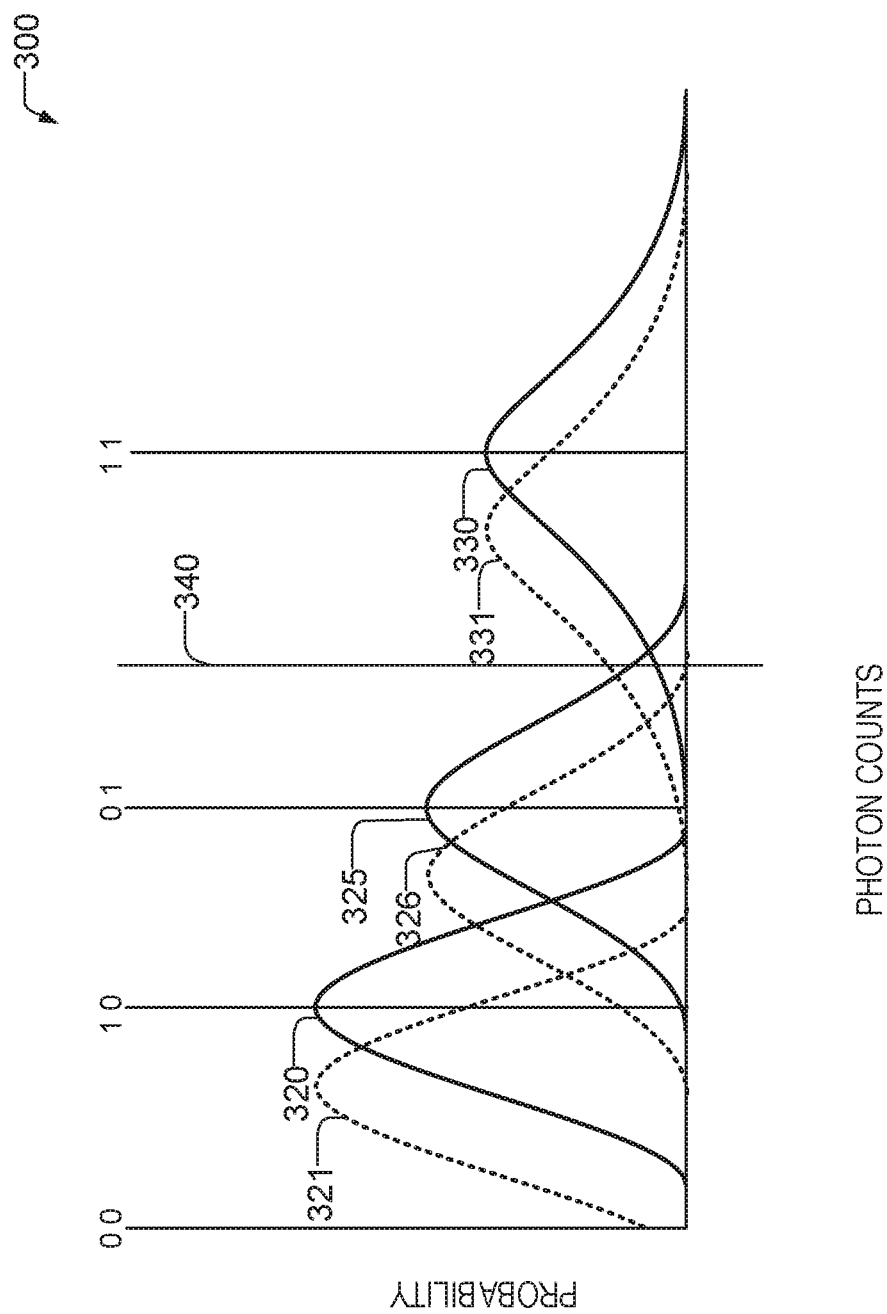
FIG. 3 illustrates a bit error and a subsequent blind decision optimization to three detection models according to some examples of the present disclosure.

FIG. 3 illustrates a bit error and a subsequent blind decision optimization 300 to three detection models according to some examples of the present disclosure. In the example of FIG. 3, the detection models are Poisson probability curves with photon counts on the x-axis and the resultant probability on the y axis. In the example of FIG. 3, a simple modulation scheme is used in conjunction with OPLM whereby the light source turns off to transmit a zero and activates to transmit a one for a particular timeslot. Other modulation schemes may be used in conjunction with OPLM to achieve even higher data rates. The bit combinations for each of the original detection models 320, 325, and 330 are shown on top of the vertical lines bisecting each model.

In the example of HU 3, a photon count 340 (represented by a vertical line) is received. According to the original detection models 320, 325, and 330, this is demultiplexed as a bit combination of 0, 1 due to the probability produced by original detection model 325 being the highest (shown by where the vertical line representing photon count 340 intersects the probability models). If the subsequent ECC check indicates that there is an error, then an error metric may be updated. If the error metric surpasses a threshold (e.g., the optimization condition is observed), then the system may optimize the models based upon the observed data set.

In the example of FIG. 3, assuming only the one sample photon count 340 in the observed data set, the incorrect bit assignment of 0 1 and the correct bit assignment (as determined by the ECC) of 1, 1, the system may try and optimize the original detection models 320, 325, and 330 so as to correct the error. For example, the original detection models 320, 325, and 330 may be shifted left on the graph to produce updated detection models 321, 326, and 331. Using the updated detection models 321, 326, and 331, the model 331 is now the model that returns the highest probability for photon count 340, and thus the new bit assignment would be 1, 1 which, according to the ECC is correct. Subsequent demodulation attempts will utilize the updated detection models.

For detection models that are based upon Poisson distributions, to update the detection models, the system may calculate new detection models based upon the photon counts of the data in the observed data set. For example, for each bit combination as determined by the ECC data, the photon counts observed may be averaged to determine a new Poisson distribution for that bit combination. For example, if the observed data is as shown in this table:

| Photon Counts | Actual bit value (as determined by ECC) |
|---|---|
| 0 | (0, 0) |
| 30 | (0, 1) |
| 45 | (0, 1) |
| 17 | (0, 1) |
| 33 | (0, 1) |
| 50 | (1, 0) |
| 55 | (1, 0) |
| 67 | (1, 0) |
| 88 | (1, 0) |
| 115 | (1, 1) |
| 122 | (1, 1) |
| 137 | (1, 1) |

The new average photon counts for each bit combination would be as follows:

| Bit Combination | Average Photon Counts |
|---|---|
| (0, 0) | 0 |
| (0, 1) | 31.25 |
| (1, 0) | 65 |
| (1, 1) | 124.6 |

In some examples, the models may be wholly replaced by t observed photon count data from the observed data. In other examples, the photon counts from the training process run when initially building the models may be combined with the observed data to form the new model. In these examples, the training data may be combined in a way that weighs its contribution to the new detection models based upon how recent the training data was observed. For example, for Poisson distribution models, the receiver may use the formula:

New average photon count=$((1-x)$*training average photon count$)+((x)$*observed average photon count$)$ where $0 \leq x \leq 1$ As noted, x may be based upon a time elapsed since the training occurred. In other examples, x may be based upon the optimization metrics. For example, x may depend on the error rate, such that the higher the error rate, the higher x is, and the less the receiver relies upon the old model in calculating the new model (as it indicates that the training data is less reliable).

For detection models that are not a Poisson distribution, such as machine-learned models, the system may apply the observed data to update the model by either retraining the model using both the previous observed data and training data or by utilizing incremental learning approaches to acquire new knowledge without forgetting the previously acquired knowledge. An example algorithm of the latter kind is the Learn++ algorithm for a supervised neural network.

Figure 4:
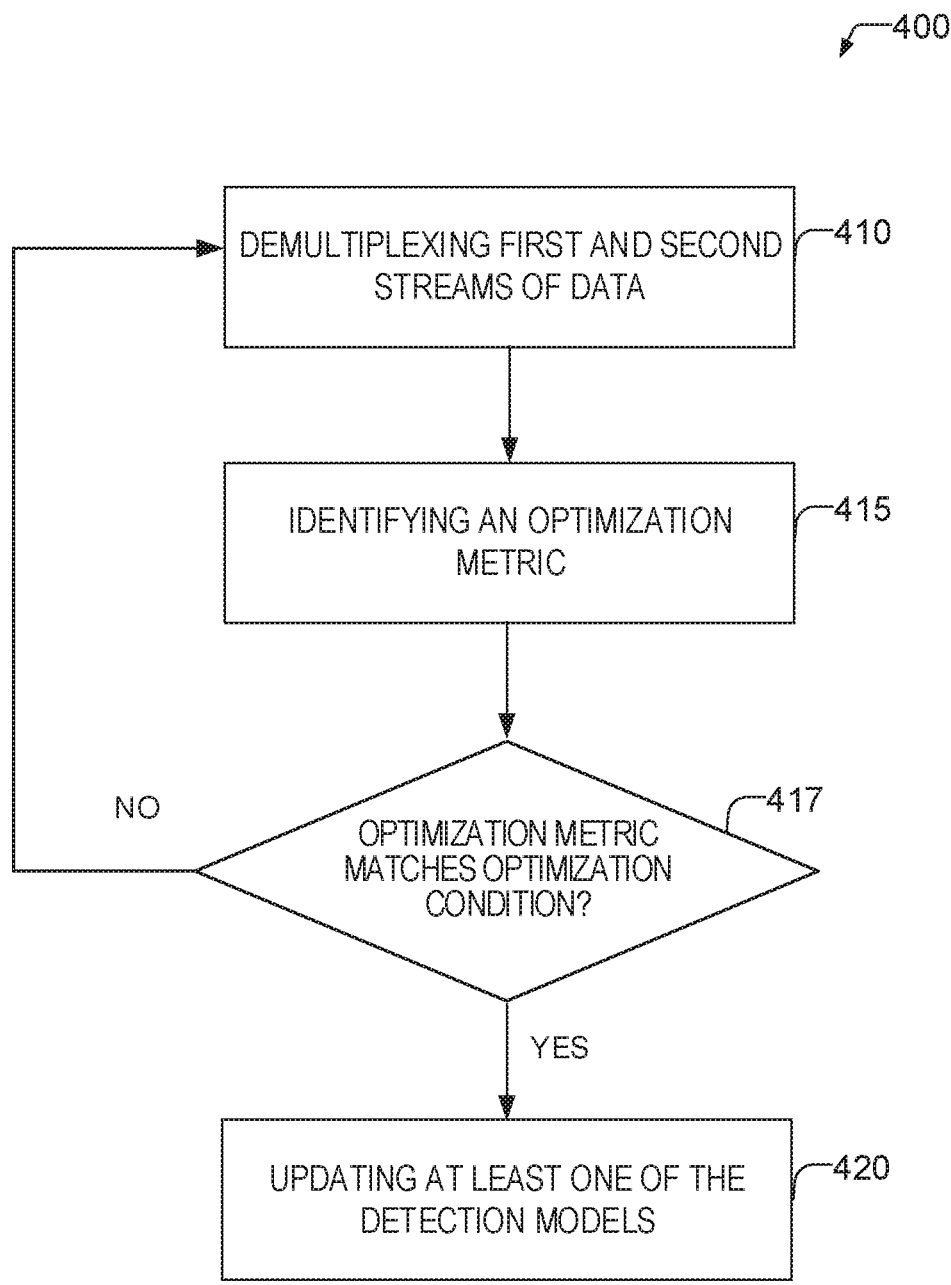
FIG. 4 illustrates an example of a method of blind updating a detection model according to some examples of the present disclosure.

FIG. 4 shows an example of a method 400 of blind updating a detection model according to some examples of the present disclosure. At operation 410 the receiver demultiplexes the first and second streams of data. For example, by performing the operations of FIG. 2. As previously described, for each predetermined time period a photon count is determined from observed photons striking a photon detector of a receiver. The photon count is submitted to one or more detection models. For example, for two streams produced by two light sources at two different power levels, a first detection model may provide a probability that the photon count was produced by a first light source being activated alone at a first power level, a second detection model may provide a probability that the photon count was produced by a second light source being activated alone at a second power level, and a third detection model may provide a probability that the photon count was produced by both the first and second light sources being activated at the first and second power levels. In some examples, a fourth detection model may provide a probability that the photon count was produced by neither light source being activated. In other examples, if the photon count is below a minimum photon count it may be determined that neither light source is likely to have been activated during the time period. In some examples, the models may be Poisson probabilities.

As previously noted, each detection model may be associated with a particular bit assignment for each data stream. In a simple modulation scheme where a light source being activated signals a '1' for the bitstream it transmits and a light source being off signals a '0' for the bitstream it transmits: the first detection model may correspond to a bit assignment of 1 for the first stream corresponding to the first light source and 0 for the second stream corresponding to the second light source, the second detection model may correspond to a bit assignment of 1 for the second stream corresponding to the second light source and 0 for the first stream corresponding to the first light source, the third detection model may correspond to a bit assignment of 1 for each stream. In some examples, the model that has the highest probability given the photon count observed is selected and the bit assignment corresponding to that model is utilized to assign bits to the bitstreams.

At operation 415 an optimization metric may be identified, calculated, updated, or otherwise determined. For example, the first and second data streams may have an error correction code (ECC) scheme applied. Example ECC schemes include convolutional codes, block codes, Reed-Solomon codes, Hamming codes, Turbo codes, low-density parity-check codes (LDPC), and the like. These ECC schemes may not only be able to detect errors but correct one or more errors in the data. In some examples the optimization metric may be an error rate, such as a percentage of decoded data that has a correctable, or uncorrectable ECC error. Since both streams have ECC applied, the metric may be a combined ECC error rate, or error rates of each individual stream individually.

At operation 417, the receiver compares the optimization metric to an optimization condition to determine whether the optimization metric matches the optimization condition. For example, if an error rate exceeds an error threshold. If the optimization metric does not match the optimization condition e.g., the error rate does not exceed the threshold) flow proceeds back to demultiplexing the data. If the optimization metric does match the optimization condition (e.g., the error rate exceeds the threshold), flow proceeds to operation 420. In some examples, the optimization condition may be a single error for bit-by-bit adjustments.

At operation 420, one or more of the detection models may be updated. For example, the detection models may be updated based upon an observed data set. The observed data set may comprise received photon counts and corresponding actual bit assignments derived from an error correction operation performed on predicted bit assignments determined during the demultiplexing. For example, when there are no ECC errors, the system may store the received photon counts and the associated bit assignments produced by the photon counts. When there are ECC errors, the error bits may be corrected and the system may store the received photon counts and the associated corrected bit assignments.

As previously explained, the models may be updated by calculating new average photon counts using the observed data for Poisson distribution detection models. In other examples, the models may be updated by making one or more adjustments to the models—for example, shifting the median, or distribution of the models. In some examples, a number of random shifts may be made and then checked with the observed set to see if the error rate on the observed set would be reduced. The random shifts that produce the smallest error rate on the observed set may be utilized as the updated model. In examples in which the detection models are machine-learned models, the models may be updated by retraining the model with the observed set and/or the training data set or utilizing an incremental learning algorithm to update the model for machine learned models such as neural networks and other supervised machine learning models.

In other examples, rather than storing Observed data, a running average photon count for each correct bit assignment (as determined by ECC) may be kept. Thus, the average photon count and the bit assignment as determined by ECC—are added to a running average photon count for that particular bit assignment and the model is instantly updated with this particular average photon count. This allows the bit assignments to react quickly to changing conditions. In some examples, the change in the average photon count may be applied to all detection models but in other examples, it may only be applied to the detection model corresponding to the ECC corrected bit assignment.

In examples in which the model is a machine-learned algorithm, each corrected bit combination and associated photon count may be fed to a incremental learning algorithm to update the model on a bit-by-bit basis.

In some examples, if the ECC error is not correctable, a portion of the data may be lost and a retransmission sequence may be initiated. Uncorrectable ECC errors may not be used to optimize the model in some examples. In some examples, uncorrectable ECC errors may still be counted in the optimization metric and factors into whether the models are optimized. In still other examples, if the number or rate of uncorrectable ECC errors exceeds a threshold, the receiver may initiate a new training sequence.

Figure 5:
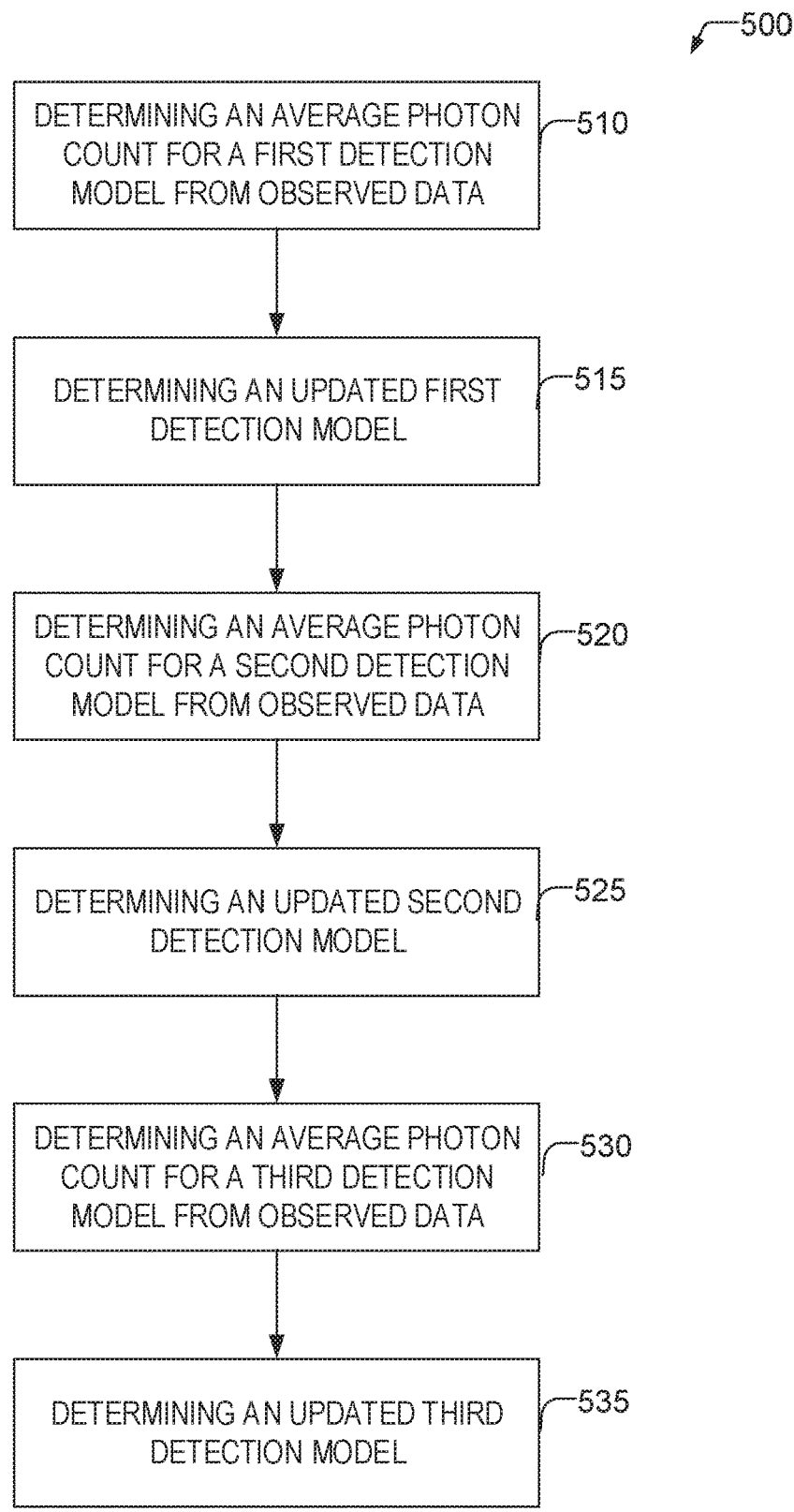
FIG. 5 illustrates a method of updating a detection model according to some examples of the present disclosure.

Turning now to FIG. 5, a method 500 of updating a detection model is shown according to some examples of the present disclosure. The method 500 applies to Poisson detection models. At operation 510, an average photon count for a first detection model is determined from observed data and/or training data. For example, if the first detection model corresponds to bit assignment of 1 for the first stream and 0 for the second stream, the photon counts corresponding to bit assignments of 1,0 as corrected by any ECC, from any observed data (and/or training data) may be summed and divided by a number of samples to determine an average photon count. In some examples, the photon counts (or average photon counts) from one or more previous training phases may also be used in calculating an updated detection model. At operation 515, the new average photon count is used to determine an updated first detection model. For example, a Poisson detection model may be given by the following equation:

$$P(\text{photon counts } t) = e^{-\lambda} \frac{\lambda^t}{t!} \quad \text{Equation 1}$$

At operation 520, an average photon count for a second detection model is determined from observed data and/or training data. For example, if the second detection model corresponds to a bit assignment of 1 for the second stream and 0 for the first stream, the photon counts corresponding to bit assignments of 0,1 as corrected by any ECC, from any observed data may be summed and divided by a number of samples to determine an average photon count. In some examples, the photon counts (or average photon counts) from one or more previous training phases may also be used in calculating an updated detection model. At operation 525, the new average photon count is used to determine an updated second detection model. For example, equation 1 shown above.

At operation 530, an average photon count for a third detection model is determined from observed data and/or training data. For example, if the third detection model corresponds to a bit assignment of 1 for the second stream and 1 for the first stream, the photon counts corresponding to bit assignments of 1,1 as corrected by any ECC, from any observed data may be summed and divided by a number of samples to determine an average photon count. In some examples, the photon counts (or average photon counts) from one or more previous training phases may also be used in calculating an updated detection model. At operation 535, the new average photon count is used to determine an updated second detection model. For example, equation 1 shown above.

In some examples, the receiver may use additional detection models (e.g., for 0,0) in those examples, those detection models may also be updated. FIG. 5 shows an example of method 500 where all the detection models were updated, but in other examples, not all detection models may be updated. For example, optimization metrics and conditions may be specific to particular bit combinations. In these examples, only the models with bit combinations where the optimization metrics match the optimization criteria may be updated.

As noted previously, the corrected bit assignment values may be utilized to calculate an update to the model. The corrected bit assignments may be determined by an ECC that is applied to each stream. The ECC of each stream may be independent of the other stream. That is, the ECC applied to a first stream may be distinct from the ECC applied to the second stream, and so on.

The observed data set may be kept for a particular time period. For example, a predetermined number of the most recently received data sets may be stored and used to adjust the detection models. In other examples, the receiver may store observed data for each model separately. Thus, for example, the first detection model may have a buffer for storing observed data corresponding to the bit combination associated with the first detection model, the second detection model may have a buffer for storing observed data corresponding to the bit combination associated with the second detection model, and so on. Once the buffer is full, the oldest observed data may be deleted and replaced with the new observed data and so on. This ensures that the observed data is not dominated by data corresponding to a single detection model and provides a broad basis with which to calculate all the detection models.

Example Transmitters and Receiver

Figure 6:
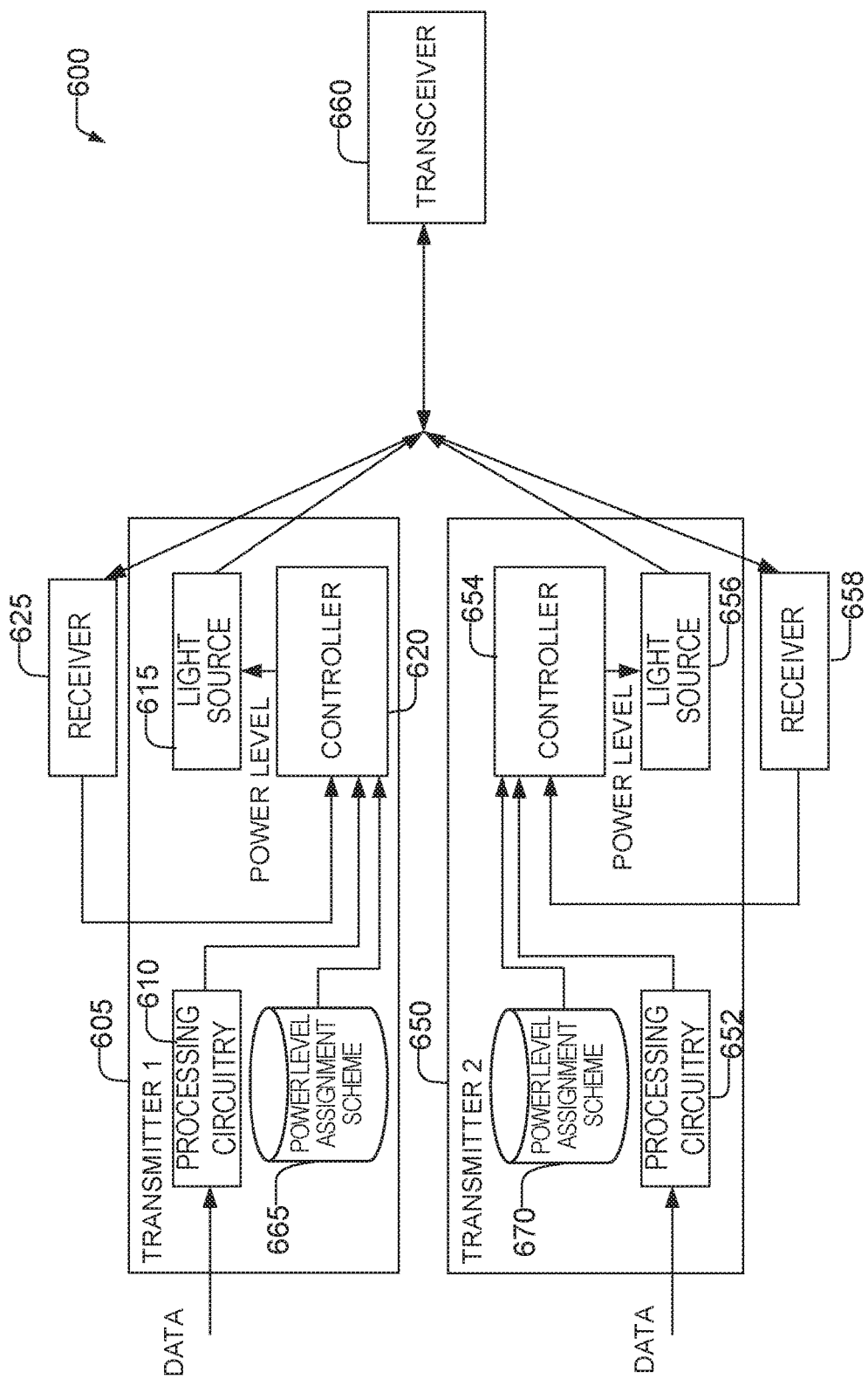
FIG. 6 illustrates a schematic of a system for increasing fiber optic bandwidth according to some examples of the present disclosure.

Turning now to FIG. 6, a schematic of a system 600 for increasing fiber optic bandwidth is shown according to some examples of the present disclosure. First transmitter 605 may include processing circuitry 610 to transform the data stream to prepare it for transmission on the fiber optic fiber. Example operations include applying an ECC, encryption, modulation operations, and the like. The transformed bits are used as a signal to the controller 620 to instruct the light source 615 to selectively turn on or off to represent the transformed bit stream according to a modulation scheme. For example, by turning the light source 615 on in response to a '1' in the bit stream and turn the light source off in response to a '0' in the bit stream. The controller 620 may set the power of the light source 615 based upon the power level indicated in an assigned power level assignment scheme and based upon a current phase of the power level assignment scheme. The power level assignment scheme is any formula or plan that is used to coordinate differing power levels across two or more transmitters. For example, the transmitters may alternate which transmitter transmits at a particular power level. The power level assignment scheme may be divided into one or more phases. A phase specifies a unit of a power level assignment scheme where each transmitter serviced by the scheme is assigned a power level for either a defined duration or until the occurrence of a defined event. The duration may be time-based, data length-based (e.g., a defined number of timeslots), or the like. In some examples, the detection models used by the receiver may be specific to the current phase of the power level assignment scheme. Power level assignment schemes may be described by one or more data structures. For example, a formula, table, chart, or other indicator. In cases in which modulation schemes that vary power are utilized, the power level may be an average power level over a particular timeslot. The indication of which power level assignment scheme is active and which phase is active may be stored in power level assignment scheme storage 665.

Light source 615 transmits light over an optical communication path which may be through a medium such as a fiber optic fiber to a receiver. Example light sources may include an LED or a LASER light source, Controller 620 and processing circuitry 610 may be general purpose processors or may be specially designed circuits configured to implement the techniques described herein. Power level assignment scheme storage 665 may be flash storage, Read Only Memory (ROM) or other transitory or non-transitory storage.

Transmitters 605 and 650 may be transceivers in that they may have associated receivers, such as a receivers 625, 658. The power level assignment scheme may be assigned by the receiver 660 (which also may be a transceiver), through agreement with the second transmitter 650, or the like. The assigned power level assignment scheme may be one of a predetermined library of assignment schemes that is stored in the power level assignment scheme storage 665. In some examples, the assigned power level assignment scheme may be based upon a scheme in the library of assignment schemes but modified for one or more of the particular transmitters and receivers involved in the communication session. In yet other examples, the assigned power level assignment scheme may be custom to the particular communication session. The power level assignment scheme storage 665 may store the particular assignment scheme, a selection of the particular assignment scheme, any customizations in use, the current phase, and/or the like.

Receiver 625 may be a fiber optic receiver, but also may be an out-of-band receiver such as a WiFi receiver, a Bluetooth receiver, an ethernet receiver, or the like. Receiver 625 may receive instructions from the receiver 660 that are passed to the controller to turn on or off the light source 615 during model training for the receiver.

Second transmitter 650 may include similar components as first transmitter 605. For example, a controller 654, a light source 656, processing circuitry 652, a receiver 658, a power level assignment scheme storage 670, and the like. In some examples, if first transmitter 605 and second transmitter 650 are in a same device, one or more components may be shared between first transmitter 605 and second transmitter 650, Additionally, first transmitter 605 and second transmitter 650 may send multiple streams of data over the fiber optic cable to receiver 660 over multiple different wavelengths. Thus, the first transmitter 605 and second transmitter 650 may utilize both the techniques of the present invention to send multiple streams of data simultaneously over a same fiber by altering power levels, but also multiple streams using different wavelengths.

Figure 7:
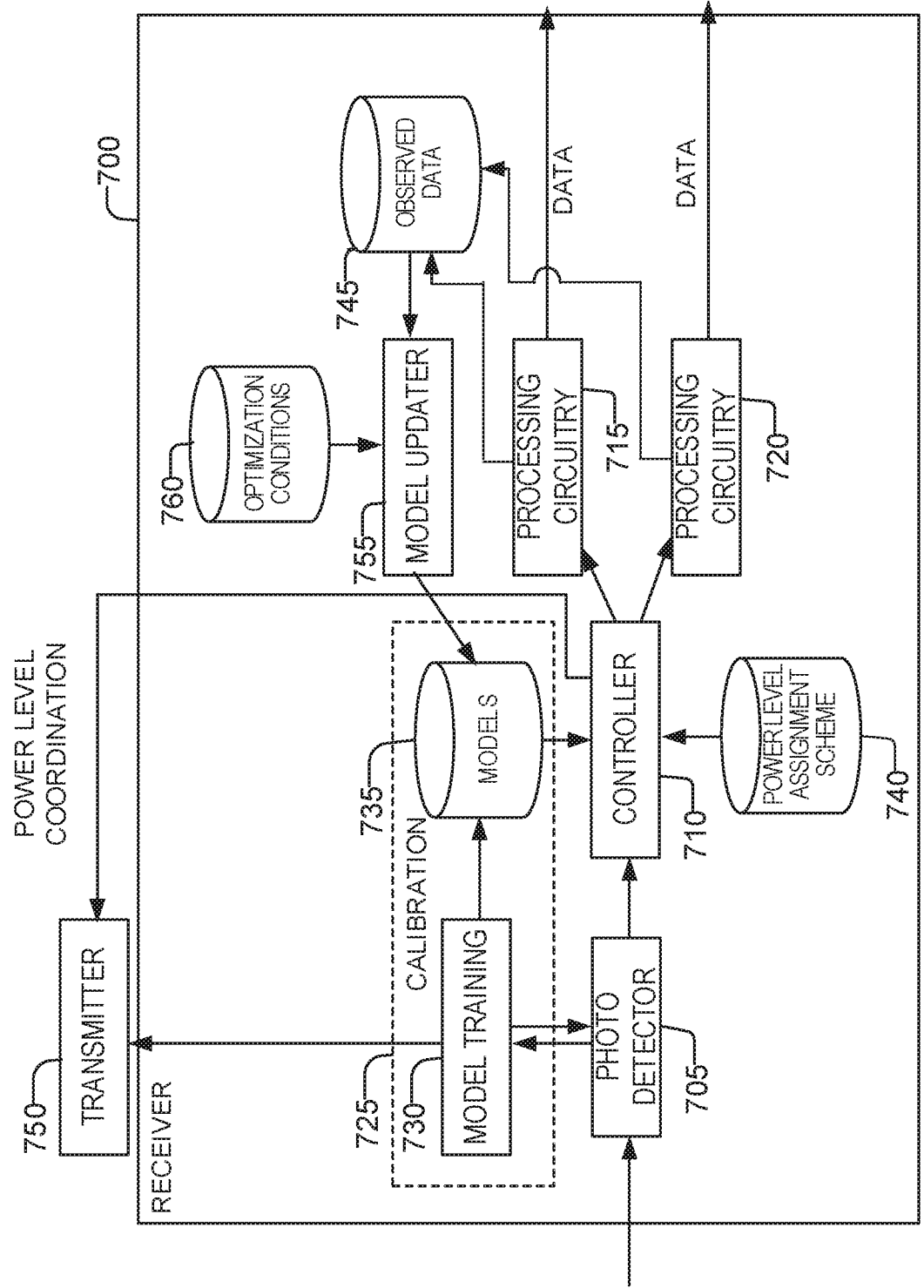
FIG. 7 illustrates a schematic of a receiver according to some examples of the present disclosure.

FIG. 7 shows a schematic of a receiver 700 according to some examples of the present disclosure. For example, receiver 700 may be an example receiver that is part of transceiver 660. Receiver 700 may include a photo detector 705 that detects and/or counts photons received over an optical communication path such as a fiber optic fiber over a predetermined time period (e.g., a timeslot). The photon counts are passed to the controller 710. Controller 710 may utilize one or more detection models stored in model storage 735 to determine individual bits in a bit stream. For example, the models may comprise one or more Poisson distributions that may return the probability that the photon counts correspond to one or more particular bit combinations for each stream. The particular detection models to use may be selected based upon the current phase of the current power level assignment scheme. The current phase and/or the selected power level assignment scheme may be stored in power level assignment scheme storage 740.

For example, consider a simple power level assignment scheme in which two light sources simultaneously transmit across a same communication path (e.g., fiber optic fiber) on a same wavelength. The power level assignment scheme alternates which of the two light sources—corresponding to two distinct data streams activates on a high power level on a bit-by-bit basis. On the first bit, stream 1 is the high power light source and stream 2 is the low power light source. The received photon counts for the period of time in which the first bit is to be transmitted is submitted to a first detection model set that includes models trained to detect the first light source activating at a high power (with the second light source being off), the second light source activating at low power (with the first light source being off), and both activated at their respective assigned powers. The detection model to return a highest score (e.g., detection probability) is used to assign values to the bit stream. For example, if the detection model trained to detect the first light source activated at a high power (with the second light source being off) returns the highest probability, then a '1' is assigned to the bit stream corresponding to the first light source and a zero to the bit stream corresponding to the second light source (e.g., based upon the modulation scheme where a '1' is indicated by activation of the light source and '0' is indicated by light source being off).

On the second phase, stream 1 is the low power light source and stream 2 is the high-power light source. The received photon counts for the period of time in which the second bit is to be transmitted is submitted to a second detection model set that includes models trained to detect the first light source activated at a low power (with no activation of the second light source), the second light source activated at a high power (with no activation of the first light source), and both transmitting a '1' at their respective assigned powers. The detection model to return a highest score (e.g., detection probability) is used to assign values to the bit stream. For example, if the detection model trained to detect the first light source activated at a low power (with no activation of the second device) returns the highest probability, then a '1' is assigned to the bit stream corresponding to the first light source and a zero to the bit stream corresponding to the second light source.

Each bit stream determined by the controller is then passed to the processing circuitry 715 and 720 respectively, which decodes the bit stream, and performs various operations (such as an inverse of the operations performed by the processing circuitry 610 and 652 of the transmitters in FIG. 6) and outputs bitstreams to higher level layers (such as a Physical, Transport, or other network layers). Example inverse operations may include detecting and correcting errors using ECC. As the processing circuitry 715, 720 decodes the ECC, the correct bit assignments and the photon counts are stored in an observed data store 745. As the demultiplexing operations progress, model updater 755 monitors one or more optimization metrics and compares those to one or more optimization conditions stored in an optimization conditions data store 760. The optimization conditions may be determined in advance by an administrator (and entered into the optimization conditions through one or more user interfaces), entered by a system designer, or the like. If the optimization metrics meet an optimization condition, the model updater may utilize the observed data in observed data store 745 to update the detection models in model storage 735. In examples in which the models are optimized in a bit-by-bit manner, the model updater 755 continuously updates the models 735.

Calibration components 725 may initially train the models and may include a model training component 730 which may instruct the transmitters (through a transmitter 750) to transmit various test data sequences. The models may be built using photon counts observed by the photo detector 705. For example, by using average photon counts to create the models, or by submitting the photon counts to a training module, such as training component 810 of FIG. 8.

In some examples, the controller 710 may also select and control the power level assignment scheme. For example, by communication with the transmitters to select and/or customize a scheme. This may happen before the communication session with the transmitters and/or periodically during the communication session. In other examples, where the transmitters agree to the power level assignment scheme, the controller 710 receives messages indicating which power level assignment scheme is active. The controller may determine the current phase by messaging to and/or from one or more of the transmitters (e.g., for QoS based approaches or modifications), based upon an elapsed time from the last phase, or the like.

Figure 8:
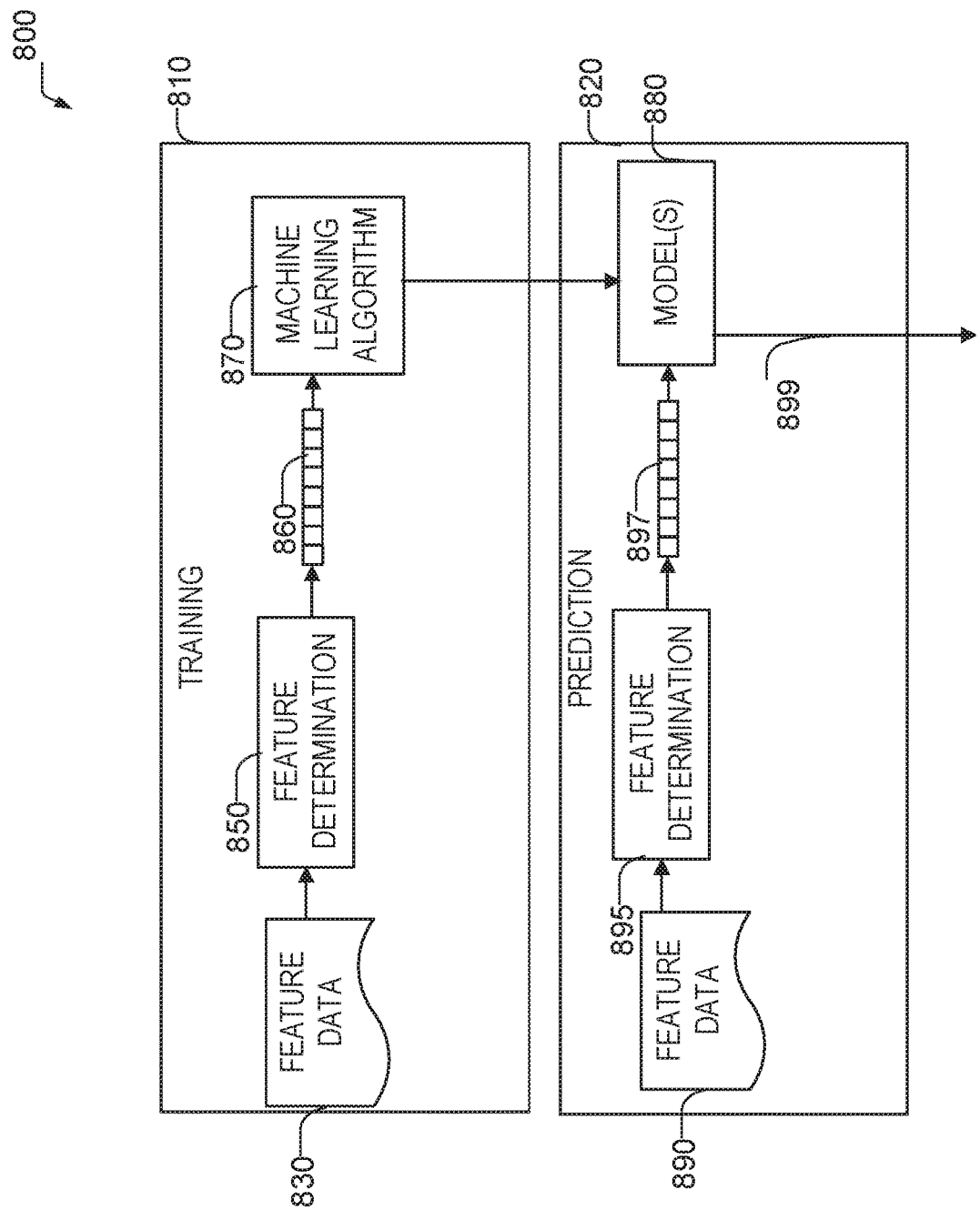
FIG. 8 illustrates an example machine learning component according to some examples of the present disclosure.

FIG. 8 shows an example machine learning component 800 according to some examples of the present disclosure. The machine learning component 800 may be implemented in whole or in part by the model training component 730 and/or the model updater 755. The machine learning component 800 may include a training component 810 and a prediction component 820. In some examples, the training component 810 may be implemented by a different device than the prediction component 820. In these examples, the model 880 (e.g., a detection model) may be created on a first machine and then sent to a second machine.

Machine learning component 800 utilizes a training component 810 and a prediction component 820. Training component 810 inputs feature data 830 into feature determination component 850. The feature data 830 may be photon counts, phases, and the like. In some examples, the feature data may be explicitly labeled with the bit assignments for each stream, the light source(s) currently transmitting, the power level the light source(s) that are currently transmitting are transmitting at, and the like. For example, the feature data may be or include data from the observed data set.

Feature determination component 850 determines one or more features for feature vector 860 from the feature data 830. Features of the feature vector 860 are a set of the information input and is information determined to be predictive of a bit assignment for each stream. Features chosen for inclusion in the feature vector 860 may be all the feature data 830 or in some examples, may be a subset of all the feature data 830. In examples in which the features chosen for the feature vector 860 are a subset of the feature data 830, a predetermined list of which feature data 830 is included in the feature vector may be utilized. The feature vector 860 may be utilized (along with any applicable labels) by the machine learning algorithm 870 to produce one or more detection or other models 880.

In the prediction component 820, the current feature data 890 (e.g., photon counts) may be input to the feature determination component 895. Feature determination component 895 may determine the same set of features or a different set of features as feature determination component 850. In some examples, feature determination component 850 and 895 are the same components or different instances of the same component. Feature determination component 895 produces feature vector 897, which are input into the model 880 to determine results 899 such as bit assignments, phases, power level assignment schemes, or the like.

The training component 810 may operate in an offline manner to train the model 880. The prediction component 820, however, may be designed to operate in an online manner. It should be noted that the model 880 may be periodically updated via additional training and/or user feedback. For example, observed data sets may be used to retrain or update the model(s) 880.

The machine learning algorithm 870 may be selected from among many different potential supervised or unsupervised machine learning algorithms. Examples of supervised learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic interaction Detector (CHAD), and the like), random forests, linear classifiers, quadratic classifiers, k-nearest neighbor, linear regression, logistic regression, support vector machines, perceptrons, and hidden Markov models. Examples of unsupervised learning algorithms include expectation-maximization algorithms, vector quantization, and information bottleneck method. Unsupervised models may not have a training component 810. In some examples, the model 880 may determine a bit for each stream based upon the detected photons. In other examples, the model 880 may produce a score or probability for each stream that a particular bit was sent.

The machine learning models may also be used to select a power level assignment scheme. In these examples, the feature data 830, 890 may be information predictive of a proper power level assignment scheme. The features discussed above may be utilized as feature data 830, 890—such as a power budget, transmitter characteristics, receiver characteristics, and the like. The results 899 may be a ranking and/or selection of a power level assignment scheme.

The modulation schemes utilized herein have been relatively simple (on or off to represent a '1' or a '0'). In other examples, different modulation schemes may be utilized. For example, if the light sources and the receivers are capable, WDM, phase shift modulation, amplitude modulation, and other advanced modulation forms may be utilized in addition to the techniques described herein. For example, a plurality of bitstreams may be divided into a plurality of wavelengths—where each wavelength may have multiple streams of data that are sent using the methods disclosed herein. Similarly, for power modulation, a power assignment scheme of the present invention may assign multiple power levels to each transmitter—where each power level is a particular bit combination. Thus, first transmitter may be assigned power levels 1, 2, and 3 (to indicate '01', '10', and '11' bits respectively) and second transmitter may be assigned power levels 4, 5, and 6 (to indicate '01', '10', and '11' bits respectively). In this example, the system may allocate the power levels such that the average photon counts of each power level combination are distinct enough such that the probability distributions are far enough apart so that the error rate is low.

Figure 9:
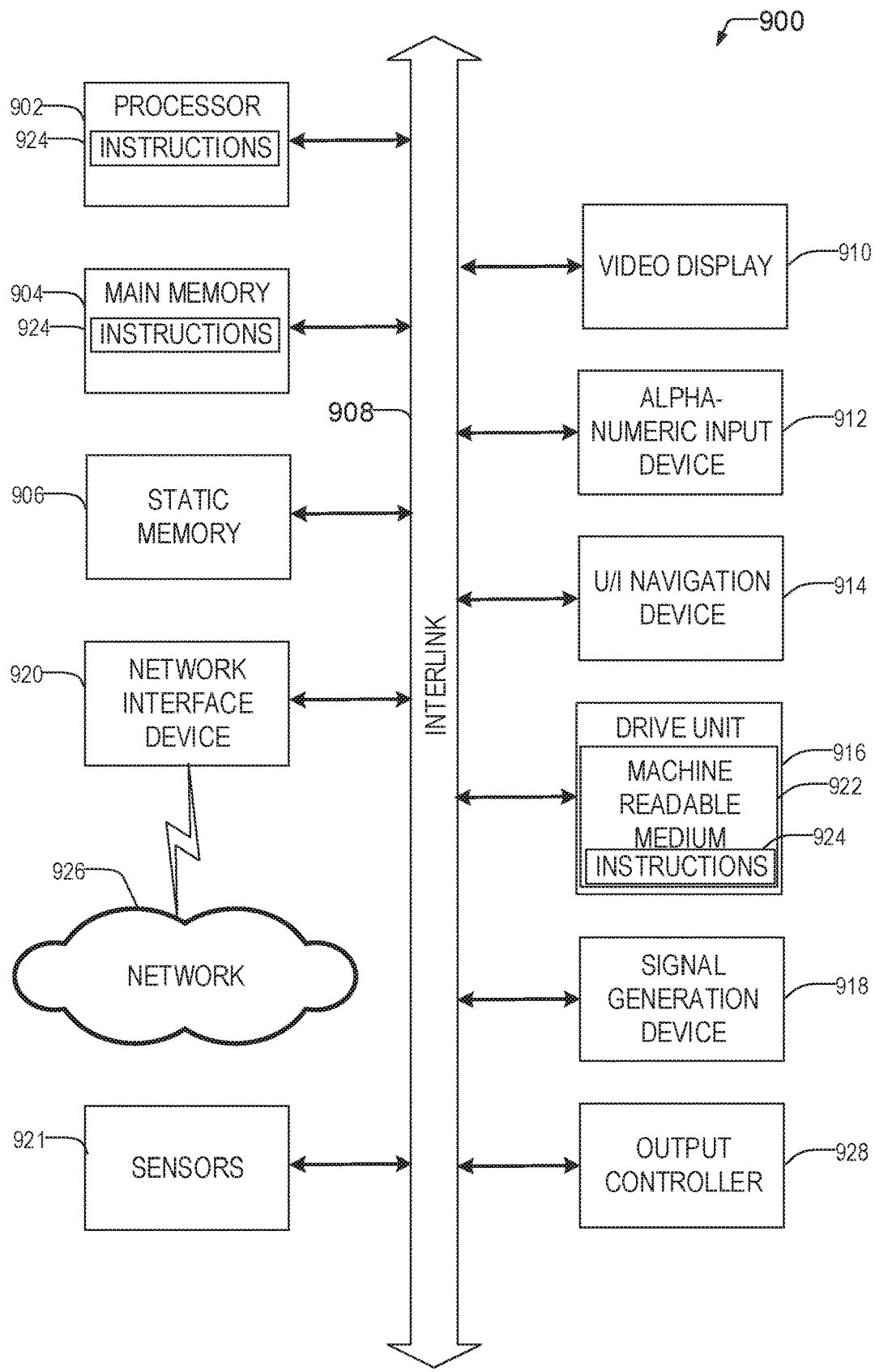
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 900 may implement the transmitters and/or receivers disclosed herein. Furthermore, machine 900 may include the transmitters and/or receivers disclosed herein. Machine 900 may implement any of the methods disclosed herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, components, or mechanisms. Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular component at one instance of time and to constitute a different component at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906; or within the hardware processor 902 during execution thereof by the machine 900. In an example, one or any combination of the hardware processor 902, the main memory 904; the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920. The Machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN); a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MEMO techniques.

OTHER NOTES AND EXAMPLES

Example 1 is a method for receiving data over an optical communication path, the method comprising: demultiplexing first and second streams of data received over the optical communication path using a plurality of detection models;

determining that an optimization metric corresponding to an output of the demultiplexing operation matches an optimization condition; and responsive to determining that the optimization metric corresponding to the output of the demultiplexing operation matches the optimization condition, updating at least one of the plurality of detection models based upon an observed data set, the observed data set comprising received photon counts and corresponding actual bit assignments as determined by an error correction operation performed on bit assignments determined during the demultiplexing operation.

In Example 2, the subject matter of Example 1 includes, wherein the optimization metric is an error rate determined based upon an Error Correction Code (ECC) and the optimization condition is an error rate threshold.

In Example 3, the subject matter of Example 2 includes, wherein the error threshold is a single error.

In Example 4, the subject matter of Examples 1-3 includes, wherein the first stream is transmitted by a first light source at a first power level, and the second stream is transmitted by a second light source at a second power level, the first and second streams transmitted simultaneously over a same frequency.

In Example 5, the subject matter of Examples 1-4 includes, wherein the detection models are Poisson probability models.

In Example 6, the subject matter of Examples 1-5 includes, wherein updating the at least one of the plurality of detection models comprises calculating a Poisson distribution from an average photon count of data in the observed data set matching an actual bit assignment corresponding to the at least one of the plurality of detection models.

In Example 7, the subject matter of Examples 1-6 includes, wherein demultiplexing first and second streams of data received over the optical communication path using a plurality of detection models comprises; submitting a count of photons detected using a photon detector during a timeslot to the plurality of detection models; and selecting a bit assignment for a first and second stream that corresponds to a detection model of the plurality of detection models that returns a highest probability.

In Example 8, the subject matter of Examples 1-7 includes, determining an error in a first bit assignment produced by the demultiplexing using an Error Correction Code (ECC); and saving the photon count that produced the first bit assignment and a correct bit assignment based upon the ECC as part of the observed data set.

In Example 9, the subject matter of Examples 1-8 includes, wherein the updating at least one of the plurality of detection models comprises updating the at least one of the plurality of detection models without utilizing a training sequence.

In Example 10, the subject matter of Examples 1-9 includes, wherein updating the at least one of the plurality of detection models comprises retraining the at least one of the plurality of detection models using the observed data set and a training data set of training data collected during a training operation.

In Example 11, the subject matter of Examples 1-10 includes, wherein updating the at least one of the plurality of detection models comprises applying the observed data set in an incremental learning algorithm to produce an updated at least one of the plurality of detection models.

In Example 12, the subject matter of Examples 1-11 includes, wherein e error correction operation utilizes an ECC.

Example 13 is a device for receiving data over an optical communication path, the device comprising: a processor; a memory comprising instructions, which when executed by the processor, causes the device to perform operations comprising: demultiplexing first and second streams of data received over the optical communication path using a plurality of detection models; determining that an optimization metric corresponding to an output of the demultiplexing operation matches an optimization condition; and responsive to determining that the optimization metric corresponding to the output of the demultiplexing operation matches the optimization condition, updating at least one of the plurality of detection models based upon an observed data set, the observed data set comprising received photon counts and corresponding actual bit assignments as determined by an error correction operation performed on bit assignments determined during the demultiplexing operation.

In Example 14, the subject matter of Example 13 includes, wherein the optimization metric is an error rate determined based upon an Error Correction Code (ECC) and the optimization condition is an error rate threshold.

In Example 15, the subject matter of Example 14 includes wherein the error rate threshold is a single error.

In Example 16, the subject matter of Examples 13-15 includes, wherein the first stream is transmitted by a first light source at a first power level, and the second stream is transmitted by a second light source at a second power level, the first and second streams transmitted simultaneously, over a same frequency.

In Example 17, the subject matter of Examples 13-16 includes, wherein the detection models are Poisson probability models.

In Example 18, the subject matter of Examples 13-17 includes, wherein the operations of updating the at least one of the plurality of detection models comprises calculating a Poisson distribution from an average photon count of data in the observed data set matching an actual bit assignment corresponding to the at least one of the plurality of detection models.

In Example 19, the subject matter of Examples 13-18 includes, wherein the operations of demultiplexing first and second streams of data received over the optical communication path using a plurality of detection models comprises: submitting a count of photons detected using a photon detector during a timeslot to the plurality of detection models; and selecting a bit assignment for a first and second stream that corresponds to a detection model of the plurality of detection models that returns a highest probability.

In Example 20, the subject matter of Examples 13-19 includes, wherein the operations further comprise: determining an error in a first bit assignment produced by the demultiplexing using an Error Correction Code (ECC); and saving the photon count that produced the first bit assignment and a correct bit assignment based upon the ECC as part of the observed data set.

In Example 21, the subject matter of Examples 13-20 includes, wherein the operations of updating at least one of the plurality of detection models comprises updating the at least one of the plurality of detection models without utilizing a training sequence.

In Example 22, the subject matter of Examples 13-21 includes, wherein the operations of updating the at least one of the plurality of detection models comprises retraining the at least one of the plurality of detection models using the observed data set and a training data set of training data collected during a training operation.

In Example 23, the subject matter of Examples 13-22 includes, wherein the operations of updating the at least one of the plurality of detection models comprises applying the observed data set in an incremental learning algorithm to produce an updated at least one of the plurality of detection models.

In Example 24, the subject matter of Examples 13-23 includes, wherein the error correction operation utilizes an ECC.

Example 25 is a machine-readable medium comprising instructions for receiving data over an optical communication path, the instructions when executed, cause a machine to perform operations comprising: demultiplexing first and second streams of data received over the optical communication path using a plurality of detection models; determining that an optimization metric corresponding to an output of the demultiplexing operation matches an optimization condition; and responsive to determining that the optimization metric corresponding to the output of the demultiplexing operation matches the optimization condition, updating at least one of the plurality of detection models based upon an observed data set, the observed data set comprising received photon counts and corresponding actual bit assignments as determined by an error correction operation performed on bit assignments determined during the demultiplexing operation.

In Example 26, the subject matter of Example 25 includes, wherein the optimization metric is an error rate determined based upon an Error Correction Code (ECC) and the optimization condition is an error rate threshold.

In Example 27, the subject matter of Example 26 includes, wherein the error rate threshold is a single error.

In Example 28; the subject matter of Examples 25-27 includes, wherein the first stream is transmitted by a first light source at a first power level, and the second stream is transmitted by a second light source at a second power level, the first and second streams transmitted simultaneously over a same frequency.

In Example 29, the subject matter of Examples 25-28 includes, wherein the detection models are Poisson probability models.

In Example 30, the subject matter of Examples 25-29 includes, wherein the operations of updating the at least one of the plurality of detection models comprises calculating a Poisson distribution from an average photon count of data in the observed data set matching an actual bit assignment corresponding to the at least one of the plurality of detection models.

In Example 31, the subject matter of Examples 25-30 includes, wherein the operations of demultiplexing first and second streams of data received over the optical communication path using a plurality of detection models comprises: submitting a count of photons detected using a photon detector during a timeslot to the plurality of detection models; and selecting a bit assignment for a first and second stream that corresponds to a detection model of the plurality of detection models that returns a highest probability.

In Example 32, the subject matter of Examples 25-31 includes, wherein the operations further comprise: determining an error in a first bit assignment produced by the demultiplexing using an Error Correction Code (ECC); and saving the photon count that produced the first bit assignment and a correct bit assignment based upon the ECC as part of the observed data set.

In Example 33, the subject matter of Examples 25-32 includes, wherein the operations of updating at least one of the plurality of detection models comprises updating the at least one of the plurality of detection models without utilizing a training sequence.

In Example 34, the subject matter of Examples 25-33 includes, wherein the operations of updating the at least one of the plurality of detection models comprises retraining the at least one of the plurality of detection models using the observed data set and a training data set of training data collected during a training operation.

In Example 35, the subject matter of Examples 25-34 includes, wherein the operations of updating the at least one of the plurality of detection models comprises applying the observed data set in an incremental learning algorithm to produce an updated at least one of the plurality of detection models.

In Example 36, the subject matter of Examples 25-35 includes, wherein the error correction operation utilizes an ECC.

Example 37 is a device for receiving data over an optical communication path, the device comprising: means for demultiplexing first and second streams of data received over the optical communication path using a plurality of detection models; means for determining that an optimization metric corresponding to an output of the demultiplexing operation matches an optimization condition; and responsive to determining that the optimization metric corresponding to the output of the demultiplexing operation matches the optimization condition, means for updating at least one of the plurality of detection models based upon an observed data set, the observed data set comprising received photon counts and corresponding actual bit assignments as determined by, an error correction operation performed on bit assignments determined during the demultiplexing operation.

In Example 38, the subject matter of Example 37 includes; wherein the optimization metric is an error rate determined based upon an Error Correction Code (ECC) and the optimization condition is an error rate threshold.

In Example 39, the subject matter of Example 38 includes, wherein the error rate threshold is a single error.

In Example 40, the subject matter of Examples 37-39 includes, wherein the first stream is transmitted by a first light source at a first power level, and the second stream is transmitted by a second light source at a second power level, the first and second streams transmitted simultaneously over a same frequency.

In Example 41, the subject matter of Examples 37-40 includes, wherein the detection models are Poisson probability models.

In Example 42, the subject matter of Examples 37-41 includes, wherein the means for updating the at least one of the plurality of detection models comprises means for calculating a Poisson distribution from an average photon count of data in the observed data set matching an actual bit assignment corresponding to the at least one of the plurality of detection models.

In Example 43, the subject matter of Examples 37-42 includes, wherein the means for demultiplexing first and second streams of data received over the optical communication path using a plurality of detection models comprises: means for submitting a count of photons detected using a photon detector during a timeslot to the plurality of detection models; and means for selecting a bit assignment for a first and second stream that corresponds to a detection model of the plurality of detection models that returns a highest probability.

In Example 44, the subject matter of Examples 37-43 includes, means for determining an error in a first bit assignment produced by the demultiplexing using an Error Correction Code (ECC); and means for saving the photon count that produced the first bit assignment and a correct bit assignment based upon the ECC as part of the observed data set.

In Example 45, the subject matter of Examples 37-44 includes, wherein the means for updating at least one of the plurality of detection models comprises means for updating the at least one of the plurality of detection models without utilizing a training sequence.

In Example 46, the subject matter of Examples 37-45 includes, wherein the means for updating the at least one of the plurality of detection models comprises means for retraining the at least one of the plurality of detection models using the observed data set and a training data set of training data collected during a training operation.

In Example 47, the subject matter of Examples 37-46 includes, wherein the means for updating the at least one of the plurality of detection models comprises means for applying the observed data set in an incremental learning algorithm to produce an updated at least one of the plurality of detection models.

In Example 48, the subject matter of Examples 7-47 includes, wherein the error correction operation utilizes an ECC.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

What is claimed is:

1. A method for receiving data over an optical communication path, the method comprising:
    demultiplexing first and second streams of data received over the optical communication path using a plurality of detection models;
    determining that an optimization metric corresponding to an output of the demultiplexing operation matches an optimization condition; and
    responsive to determining that the optimization metric corresponding to the output of the demultiplexing operation matches the optimization condition, updating at least one of the plurality of detection models based upon an observed data set, the observed data set comprising received photon counts and corresponding actual bit assignments as determined by an error correction operation performed on bit assignments determined during the demultiplexing operation,
    wherein the optimization metric is an error rate determined based upon an Error Correction Code (ECC) and the optimization condition is an error rate threshold;
    determining an error in a first bit assignment produced by the demultiplexing using the Error Correction Code (ECC); and
    saving a photon count that produced the first bit assignment and a correct bit assignment based upon the ECC as part of the observed data set.

2. The method of claim 1, wherein the first stream is transmitted by a first light source at a first power level, and the second stream is transmitted by a second light source at a second power level, the first and second streams transmitted simultaneously over a same frequency.

3. The method of claim 1, wherein updating the at least one of the plurality of detection models comprises calculating a Poisson distribution from an average photon count of data in the observed data set matching an actual bit assignment corresponding to the at least one of the plurality of detection models.

4. A device for receiving data over an optical communication path, the device comprising:
    a processor;
    a memory comprising instructions, which when executed by the processor, causes the device to perform operations comprising:
        demultiplexing first and second streams of data received over the optical communication path using a plurality of detection models;
        determining that an optimization metric corresponding to an output of the demultiplexing operation matches an optimization condition; and
        responsive to determining that the optimization metric corresponding to the output of the demultiplexing operation matches the optimization condition, updating at least one of the plurality of detection models based upon an observed data set, the observed data set comprising received photon counts and corresponding actual bit assignments as determined by an error correction operation performed on bit assignments determined during the demultiplexing operation,
    wherein the optimization metric is an error rate determined based upon an Error Correction Code (ECC) and the optimization condition is an error rate threshold;
    determining an error in a first bit assignment produced by the demultiplexing using the Error Correction Code (ECC); and
    saving a photon count that produced the first bit assignment and a correct bit assignment based upon the ECC as part of the observed data set.

5. The device of claim 4, wherein the error rate threshold is a single error.

6. The device of claim 4, wherein the first stream is transmitted by a first light source at a first power level, and the second stream is transmitted by a second light source at a second power level, the first and second streams transmitted simultaneously over a same frequency.

7. The device of claim 4, wherein the detection models are Poisson probability models.

8. The device of claim 4, wherein the operations of updating the at least one of the plurality, of detection models comprises calculating a Poisson distribution from an average photon count of data in the observed data set matching an actual bit assignment corresponding to the at least one of the plurality of detection models.

9. The device of claim 4, wherein the operations of demultiplexing first and second streams of data received over the optical communication path using a plurality of detection models comprises:
    submitting a count of photons detected using a photon detector during a timeslot to the plurality of detection models; and
    selecting a bit assignment for a first and second stream that corresponds to a detection model of the plurality of detection models that returns a highest probability.

10. The device of claim 4, wherein the operations of updating at least one of the plurality of detection models comprises updating the at least one of the plurality of detection models without utilizing a training sequence.

11. The device of claim 4, wherein the operations of updating the at least one of the plurality of detection models comprises retraining the at least one of the plurality of detection models using the observed data set and a training data set of training data collected during a training operation.

12. The device of claim 4, wherein the operations of updating the at least one of the plurality of detection models comprises applying the observed data set in an incremental learning algorithm to produce an updated at least one of the plurality of detection models.

13. A method for receiving data over an optical communication path, the method comprising:
   demultiplexing first and second streams of data received over the optical communication path using a plurality of detection models;
   determining that an optimization metric corresponding to an output of the demultiplexing operation matches an optimization condition; and
   responsive to determining that the optimization metric corresponding to the output of the demultiplexing operation matches the optimization condition, updating at least one of the plurality of detection models based upon an observed data set, the observed data set comprising received photon counts and corresponding actual bit assignments as determined by an error correction operation performed on bit assignments determined during the demultiplexing operation, wherein updating the at least one of the plurality of detection models comprises calculating a Poisson distribution from an average photon count of data in the observed data set matching an actual bit assignment corresponding to the at least one of the plurality of detection models.

14. The method of claim 13, wherein the optimization metric is an error rate determined based upon an Error Correction Code (ECC) and the optimization condition is an error rate threshold.

15. The method of claim 13, wherein the first stream is transmitted by a first light source at a first power level, and the second stream is transmitted by a second light source at a second power level, the first and second streams transmitted simultaneously over a same frequency.

16. The method of claim 13, further comprising:
   determining an error in a first bit assignment produced by the demultiplexing using an Error Correction Code (ECC); and
   saving a photon count that produced the first bit assignment and a correct bit assignment based upon the ECC as part of the observed data set.

17. A device for receiving data over an optical communication path, the device comprising:
   a processor;
   a memory comprising instructions, which when executed by the processor, causes the device to perform operations comprising:
   demultiplexing first and second streams of data received over the optical communication path using a plurality of detection models;
   determining that an optimization metric corresponding to an output of the demultiplexing operation matches an optimization condition; and
   responsive to determining that the optimization metric corresponding to the output of the demultiplexing operation matches the optimization condition, updating at least one of the plurality of detection models based upon an observed data set, the observed data set comprising received photon counts and corresponding actual bit assignments as determined by an error correction operation performed on bit assignments determined during the demultiplexing operation, wherein updating the at least one of the plurality of detection models comprises calculating a Poisson distribution from an average photon count of data in the observed data set matching an actual bit assignment corresponding to the at least one of the plurality of detection models.

18. The device of claim 17, wherein the optimization metric is an error rate determined based upon an Error Correction Code (ECC) and the optimization condition is an error rate threshold.

19. The device of claim 18, wherein the error rate threshold is a single error.

20. The device of claim 18, wherein the first stream is transmitted by a first light source at a first power level, and the second stream is transmitted by a second light source at a second power level, the first and second streams transmitted simultaneously over a same frequency.

21. The device of claim 18, wherein the operations of demultiplexing first and second streams of data received over the optical communication path using a plurality of detection models comprises:
   submitting a count of photons detected using a photon detector during a timeslot to the plurality of detection models; and
   selecting a bit assignment for a first and second stream that corresponds to a detection model of the plurality of detection models that returns a highest probability.

22. The device of claim 18, wherein the operations further comprise:
   determining an error in a first bit assignment produced by the demultiplexing using an Error Correction Code (ECC); and
   saving a photon count that produced the first bit assignment and a correct bit assignment based upon the ECC as part of the observed data set.

23. The device of claim 18, wherein the operations of updating at least one of the plurality of detection models comprises updating the at least one of the plurality of detection models without utilizing a training sequence.

24. The device of claim 18, wherein the operations of updating the at least one of the plurality of detection models comprises retraining the at least one of the plurality of detection models using the observed data set and a training data set of training data collected during a training operation.

25. The device of claim 18, wherein the operations of updating the at least one of the plurality of detection models comprises applying the observed data set in an incremental learning algorithm to produce an updated at least one of the plurality of detection models.

26. The device of claim 18, wherein the error correction operation utilizes an ECC.

* * * * *